US012078957B2

(12) United States Patent
Nojima et al.

(10) Patent No.: US 12,078,957 B2
(45) Date of Patent: Sep. 3, 2024

(54) IMAGE FORMING APPARATUS INCLUDING AIR DUCT

(71) Applicant: CANON KABUSHIKI KAISHA, Tokyo (JP)

(72) Inventors: Hiroshi Nojima, Chiba (JP); Keiko Fujita, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/185,497

(22) Filed: Mar. 17, 2023

(65) Prior Publication Data

US 2023/0315010 A1 Oct. 5, 2023

(30) Foreign Application Priority Data

Mar. 29, 2022 (JP) ................................ 2022-054094

(51) Int. Cl.
*G03G 21/00* (2006.01)
*F24F 13/00* (2006.01)
(Continued)

(52) U.S. Cl.
CPC ........... *G03G 21/206* (2013.01); *F24F 13/24* (2013.01); *F24F 2013/242* (2013.01); *G03G 15/2021* (2013.01); *G03G 2221/1645* (2013.01)

(58) Field of Classification Search
CPC ........... G03G 21/206; G03G 2221/1645; B41J 29/377; F24F 13/24; F24F 2013/242; F24F 2013/247
(Continued)

(56) References Cited

U.S. PATENT DOCUMENTS 5,152,366 A * 10/1992 Reitz ......................... F01N 1/00 181/252
6,463,230 B1 * 10/2002 Wargo .................. F04D 29/422 399/92
(Continued)

FOREIGN PATENT DOCUMENTS

JP H08156367 A 6/1996
KR 2004023368 A * 3/2004
(Continued)

OTHER PUBLICATIONS

Extended European Search Report issued in European Appln. No. 23164001.2, mailed Aug. 29, 2023.

*Primary Examiner* — Robert B Beatty
(74) *Attorney, Agent, or Firm* — ROSSI, KIMMS & McDOWELL LLP

(57) ABSTRACT

An image forming apparatus includes an image forming unit, a fan, a duct including an air intake port, an air discharge port, and a body portion having a tubular shape and forming an air passage through which air taken in through the air intake port is flown to the air discharge port, the body portion including a holed wall portion to which a plurality of through holes are formed, the plurality of through holes being passed through between an inner surface, forming the air passage, of the holed wall portion and an outer surface, that is on an opposite side from the inner surface, of the holed wall portion, and a noise absorbing member attached to the outer surface of the holed wall portion so as to cover the plurality of through holes, the noise absorbing member having a noise absorbing property.

41 Claims, 13 Drawing Sheets

(51) Int. Cl.

| | |
|---|---|
| ***F24F 13/24*** | (2006.01) |
| ***G03G 21/20*** | (2006.01) |
| *G03G 15/20* | (2006.01) |

(58) Field of Classification Search
USPC ........................................................ 399/92, 93
See application file for complete search history.

(56) References Cited

U.S. PATENT DOCUMENTS

| | | | | |
|---|---|---|---|---|
| 8,231,331 | B2 * | 7/2012 | Wu | F04D 29/422 415/206 |
| 2005/0161280 | A1 | 7/2005 | Furuya | |
| 2011/0052244 | A1 | 3/2011 | Bennett et al. | |
| 2012/0243899 | A1 * | 9/2012 | Ryuzaki | G03G 21/206 399/92 |
| 2013/0188984 | A1 * | 7/2013 | Rodriguez | G03G 21/20 399/92 |
| 2014/0212164 | A1 * | 7/2014 | Miyagawa | G03G 21/206 399/92 |

FOREIGN PATENT DOCUMENTS

| | | | |
|---|---|---|---|
| KR | 2007053950 | A * | 5/2007 |
| KR | 2012008392 | A * | 1/2012 |
| WO | 2021261138 | A1 | 12/2021 |

* cited by examiner

IMAGE FORMING APPARATUS INCLUDING AIR DUCT

BACKGROUND OF THE INVENTION

Field of the Invention

The present invention relates to an image forming apparatus for forming images on recording materials.

Description of the Related Art

Image forming apparatuses are equipped with a blowing apparatus disposed within a casing for blowing air in order to collect ozone that is generated when a photosensitive drum is charged and toner that is scattered inside the apparatus, or to discharge heat that has been generated when the apparatus is operated to an exterior of the apparatus. The blowing apparatus includes a fan for generating air current and a tubular duct. The duct forms an air passage that connects the fan with various devices such as a corona charger in which ozone is generated, a developing apparatus where scattered toner is formed, a fixing unit or a power supply being heated to a high temperature, and allows air current generated by the fan to pass therethrough.

Air current noise that is generated by the operation of the fan is an annoying noise for users. Hitherto, Japanese Patent Application Laid-Open Publication No. H08-156367 has proposed reducing of air current noise, for example, by providing a plurality of ducts having different lengths or by providing a hollow tubular side branch having a closed first end to the duct and causing air noise passing therethrough to interfere with one another.

However, further downsizing of the image forming apparatus is desired, and there is limited space within the image forming apparatus for installing fans and ducts. Therefore, it was difficult to adopt multiple ducts having different lengths or ducts with a side branch as described above to reduce the air current noise by causing interference of noises.

SUMMARY OF THE INVENTION

According to one aspect of the present invention, an image forming apparatus includes an image forming unit configured to form an image on a recording material, a fan configured to generate an air current, a duct including an air intake port through which air flows in by an operation of the fan, an air discharge port through which air flown in through the air intake port is discharged, and a body portion having a tubular shape and forming an air passage through which air taken in through the air intake port is flown to the air discharge port, the body portion including a holed wall portion to which a plurality of through holes are formed, the plurality of through holes being passed through between an inner surface, forming the air passage, of the holed wall portion and an outer surface, that is on an opposite side from the inner surface, of the holed wall portion, and a noise absorbing member attached to the outer surface of the holed wall portion so as to cover the plurality of through holes, the noise absorbing member having a noise absorbing property.

Further features of the present invention will become apparent from the following description of exemplary embodiments with reference to the attached drawings.

DESCRIPTION OF THE EMBODIMENTS

Image Forming System

The present embodiment will be described below. At first, an image forming apparatus capable of adopting a blowing apparatus according to the present embodiment will be described with reference to FIGS. 1 to 2B. An image forming system 1X illustrated in FIG. 1 includes an image forming apparatus 101, a large-capacity sheet feeding apparatus 106 having a plurality of recording material storage portions, and a sensing apparatus 107. The sensing apparatus 107 is arranged downstream of the image forming apparatus 101 with respect to a conveyance direction of a recording material S by the large-capacity sheet feeding apparatus 106, which is from right to left in FIG. 1.

Figure 1:
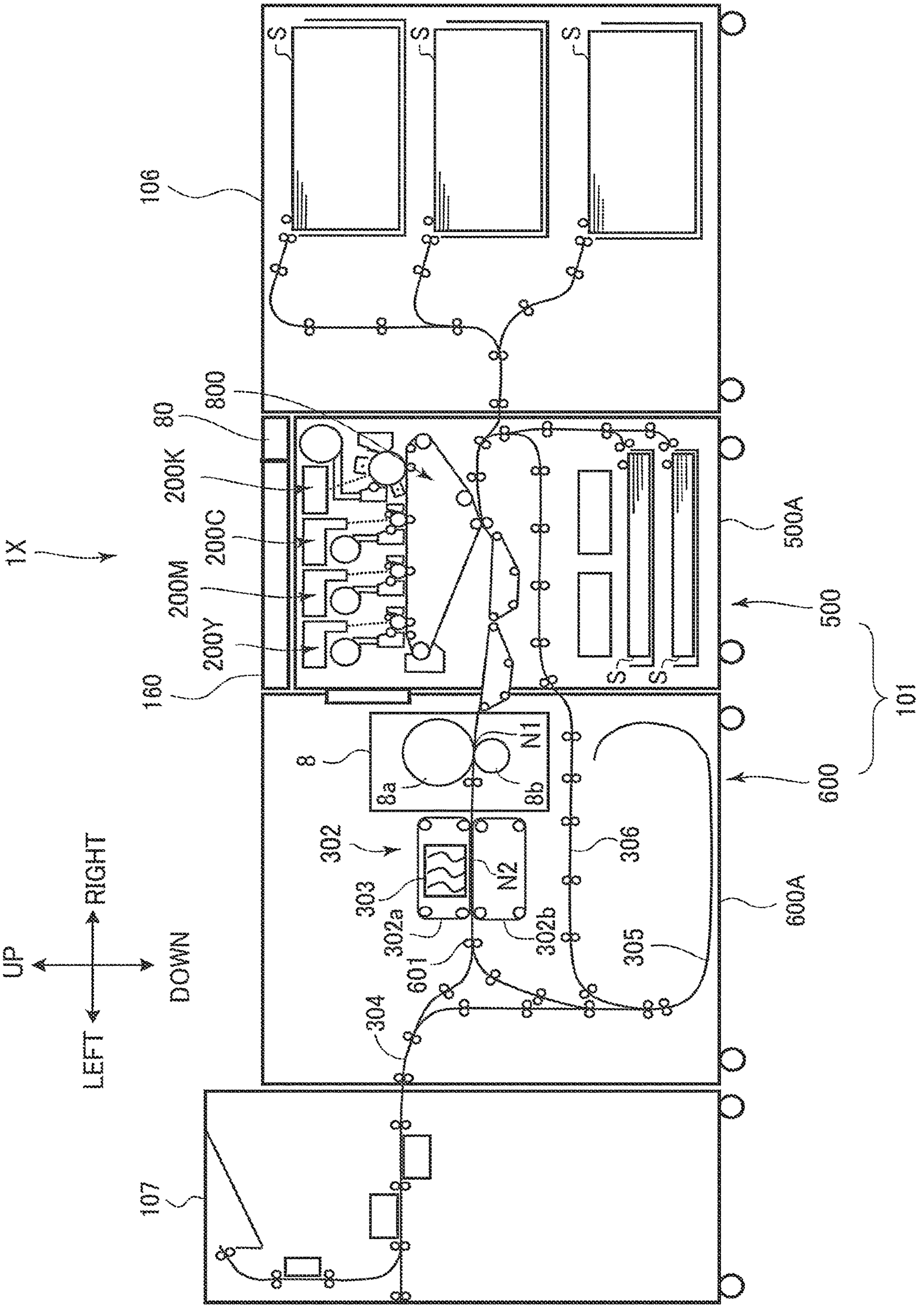
FIG. 1 is a schematic drawing illustrating an image forming apparatus capable of adopting a blowing apparatus according to a present embodiment.

In the present embodiment, a side on which the user stands when operating an operating unit 80 described below is referred to as a "front side, or front", and an opposite side thereof is referred to as a "rear side, or back". The left side viewed from the front side is referred to as "left", and the right side viewed from the front side is referred to as "right". Therefore, FIG. 1 illustrates a state in which the image forming system 1X is viewed from the front side.

The large-capacity sheet feeding apparatus 106 and the sensing apparatus 107 are connected to the image forming apparatus 101 not only physically to convey the recording materials S but also electrically to communicate electric signals therewith. The large-capacity sheet feeding apparatus 106 is an apparatus capable of supplying the recording materials S to the image forming apparatus 101. The sensing apparatus 107 is an apparatus for reading fixed toner images formed on one side or both sides of the recording material S being discharged from the image forming apparatus 101 and performing feedback thereof to the image forming apparatus 101 as image signals. The image forming apparatus 101 detects deviation of image density and image position based on the image signals subjected to feedback and corrects the image data based on the deviation of the image density or the image position being detected. Then, based on the corrected image data, image forming portions 200Y to 200K are controlled to form a toner image on the recording material S.

A manual sheet feeding apparatus or along sheet feeding apparatus capable of storing along recording material can be selectively connected, instead of the large-capacity sheet feeding apparatus 106, to the upstream side of the image forming apparatus 101 in the conveyance direction of the recording material. Alternatively, a large-capacity sheet feeding apparatus, the manual sheet feeding apparatus, and the long sheet feeding apparatus not shown can be selectively connected in succession further upstream of the large-capacity sheet feeding apparatus 106. Furthermore, although not shown, various types of postprocessing apparatuses, such as an inserter, a puncher, a case binding apparatus, a large-capacity stacker, a folding machine, a finisher, or a trimmer, can be selectively connected alone or in combination further downstream of the image forming apparatus 101 or the sensing apparatus 107. As described, by selectively connecting various optional apparatuses to areas upstream and downstream of the image forming apparatus 101, products subjected to various postprocessing treatments can be output in-line regarding recording materials S formed of various materials, and the image forming system 1X having high productivity, high image quality, superior stability, and high-performance functions can be provided.

Image Forming Apparatus

The image forming apparatus 101 is divided largely into an image forming and transferring apparatus 500 and a fixing and conveying apparatus 600, which are configured as separate apparatuses. According to the present embodiment, the image forming and transferring apparatus 500 serving as an image forming unit includes image forming portions 200Y, 200M, 200C, and 200K that perform image forming steps including a transferring process in which a toner image is transferred to the recording material S, and an intermediate transfer belt unit 800. Meanwhile, the fixing and conveying apparatus 600 includes a fixing unit 8 for realizing a fixing step for fixing the toner image on the recording material S, and a cooler 302. The image forming and transferring apparatus 500 and the fixing and conveying apparatus 600 are connected in a manner capable of having the recording material S transferred therebetween.

The image forming and transferring apparatus 500 and the fixing and conveying apparatus 600 include a casing 500A and a casing 600A that are mutually independent, each being movable by a plurality of casters disposed respectively thereto. Thereby, even if the image forming and transferring apparatus 500 and the fixing and conveying apparatus 600 are formed as large-scale apparatuses, the casing 500A and the casing 600A can be packed and shipped independently, so that the workability related to installation of the apparatuses is improved. A document reading apparatus 160 for reading image information from documents and an operating unit 80 having a display unit capable of displaying various information or keys usable by the user to enter various information can be arranged on the casing 500A.

The casing 500A and the casing 600A are each composed of a plurality of frames including a front side panel disposed on a front side, a rear side panel disposed on a rear side and supporting the image forming portions 200Y to 200K, the intermediate transfer belt unit 800, the fixing unit 8, and the cooler 302 with the front side panel, and columns that connect the front side panel and rear side panel or support the front side panel. An exterior cover made of resin that constitutes an exterior of the apparatus is attached to the casing 500A and the casing 600A. Alternatively, the image forming and transferring apparatus 500 and the fixing and conveying apparatus 600 can be disposed in one casing instead of in different casings 500A and 600A.

Image Forming and Transferring Apparatus

Figure 2A:
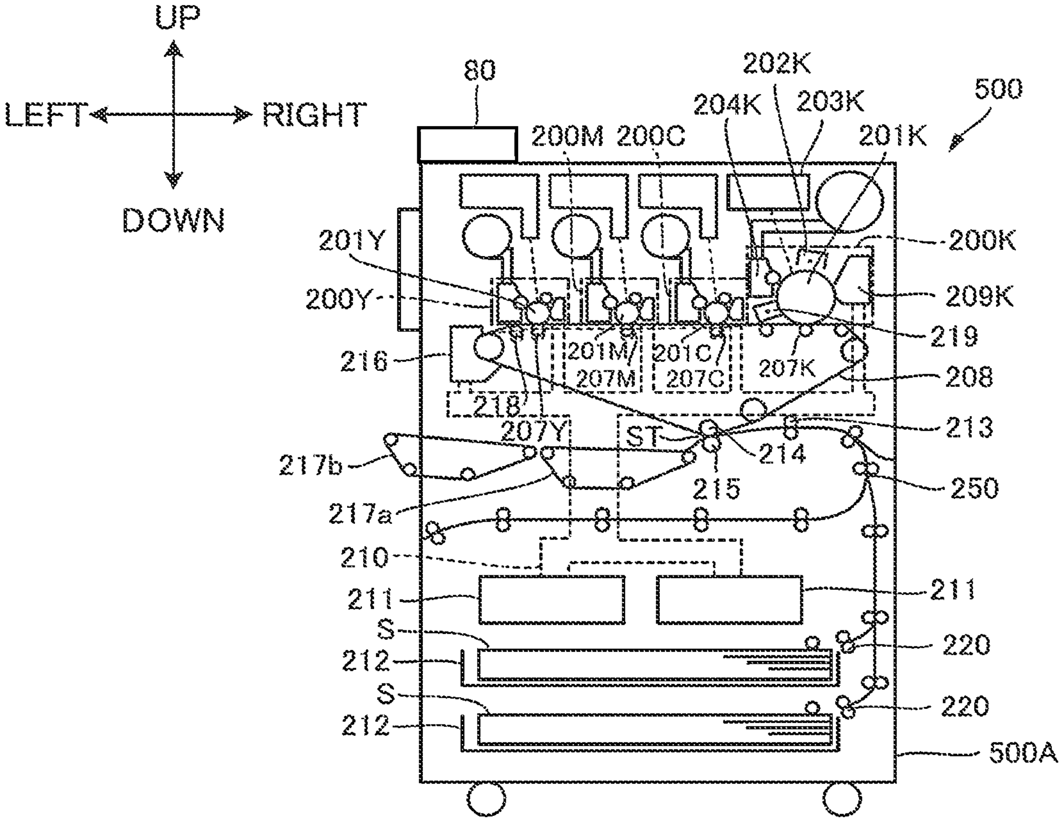
FIG. 2A is a cross-sectional view illustrating an image forming and transferring apparatus.
Figure 2B:
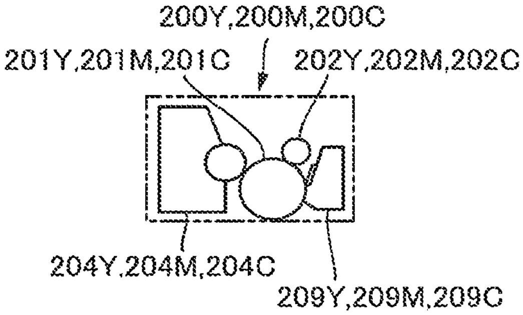
FIG. 2B is an enlarged view illustrating an image forming unit.

Next, the image forming and transferring apparatus 500 will be described with reference to FIGS. 2A and 2B. The image forming and transferring apparatus 500 is an intermediate transfer-type apparatus in which the image forming portions 200Y, 200M, 200C, and 200K stored inside the casing 500A for forming toner images of yellow, magenta, cyan, and black are arranged to face an intermediate transfer belt 208. The image forming and transferring apparatus 500 forms a toner image on the recording material S based on image data from the document reading apparatus 160 (refer to FIG. 1) disposed on an upper portion of the casing 500A or an external apparatus such as a personal computer (not shown). Sheet materials such as paper, plastic films, and cloth can be used as the recording material S.

A conveyance process of the recording material S in the image forming and transferring apparatus 500 will be described. A plurality of recording materials S are stored in a manner stacked inside one or more (two, according to the present example) cassettes 212, and they are fed one by one corresponding to image forming timing by a sheet feed roller 220. The recording material S fed by the sheet feed roller 220 is conveyed to a registration roller 213 arranged in midway of a conveyance path 250. The recording material S is subjected to skew feed correction and timing correction at the registration roller 213, and thereafter, the recording material S is sent to a secondary transfer portion ST. The secondary transfer portion ST is formed of a secondary transfer inner roller 214 and a secondary transfer outer roller 215 which oppose one another with the intermediate transfer belt 208 interposed therebetween, and it is a transfer nip portion where toner image is transferred from the intermediate transfer belt 208 to the recording material S by having predetermined pressure and secondary transfer voltage applied thereto.

Image forming process of the image that has been sent to the secondary transfer portion ST at a similar timing as the conveyance process of the recording material S to the above-described secondary transfer portion ST will be described. At first, the image forming portions 200Y to 200K will be described. Since the image forming portions 200Y to 200K of respective colors are basically the same except for the toner colors, the image forming portion 200K for black toner is described as a representative example.

The image forming portion 200K includes a photosensitive drum 201K, a charging unit 202K, a laser scanner 203K, and a developing unit 204K. The surface of the rotating photosensitive drum 201K is charged uniformly in advance by the charging unit 202K. Thereafter, the surface of the photosensitive drum 201K is exposed by the laser scanner 203K serving as an exposing unit driven based on image data, and an electrostatic latent image is formed on the photosensitive drum 201K. Next, the developing unit 204K develops the electrostatic latent image formed on the photosensitive drum 201K using toner contained in the developer, and a toner image is formed on the photosensitive drum 201K.

Thereafter, predetermined pressure and primary transfer voltage are applied by a primary transfer roller 207K arranged to oppose the image forming portion 200K with the intermediate transfer belt 208 interposed therebetween, and the toner image formed on the photosensitive drum 201K is primarily transferred to the intermediate transfer belt 208.

Primary transfer residual toner remaining on the photosensitive drum 201K after primary transfer is removed by a drum cleaner 209K. The primary transfer residual toner having been removed is stored in a collected toner container 211 via a toner collecting path 210.

The intermediate transfer belt 208 is an endless belt that is stretched across a plurality of stretch rollers and the secondary transfer inner roller 214, and moved in correspondence to a rotational speed of the photosensitive drums 201Y to 201K serving as photosensitive members by a motor not shown. The image forming processes of respective colors subjected to parallel processing by the image forming portions 200Y to 200K of respective colors described above are performed at such a timing that each toner image is superposed to a toner image of a different color that has been primary transferred upstream in the direction of movement on the intermediate transfer belt 208. As a result, finally, a full-color toner image is formed on the intermediate transfer belt 208 and conveyed to the secondary transfer portion ST. Secondary transfer residual toner remaining on the intermediate transfer belt 208 after passing through the secondary transfer portion ST is collected from the intermediate transfer belt 208 by a belt cleaner device 216. The primary transfer rollers 207Y to 207K, the intermediate transfer belt 208, a plurality of stretch rollers, the secondary transfer inner roller 214, and the belt cleaner device 216 can also be disposed integrally as the intermediate transfer belt unit 800.

According to the above-mentioned conveyance process and image forming process, the timings of the recording material S and the toner image are made to correspond at the secondary transfer portion ST, and a secondary transfer is carried out in which the toner image is transferred from the intermediate transfer belt 208 to the recording material S. Thereafter, the recording material S is conveyed via pre-fixing conveyor belts 217*a* and 217*b* to the fixing and conveying apparatus 600, and the toner image is fixed to the recording material S by the fixing and conveying apparatus 600.

In addition to forming a full-color image using all the image forming portions 200Y to 200K described above, the image forming and transferring apparatus 500 can form a black-and-white image using only the image forming portion 200K for black. When forming the black-and-white image, primary transfer rollers 207Y to 207C and a primary transfer auxiliary roller 218 are displaced downward in a vertical direction by a separation mechanism not shown. Thereby, the photosensitive drums 201Y to 201C and the intermediate transfer belt 208 are separated, and the image forming portions 200Y to 200C are stopped. Since the image forming portions 200Y to 200C are stopped, wear of components caused by unnecessary driving thereof can be prevented, and thus, the life of the image forming portions 200Y to 200C is elongated.

In the image forming portion 200K not separated with the intermediate transfer belt 208, the photosensitive drum 201K is formed to have a large diameter suitable for achieving a longer life than the photosensitive drums 201Y to 201C. Further, the charging unit 202K of the image forming portion 200K is a corona charger adopting a contactless charging system, and charging units 202Y to 202C of the image forming portions 200Y to 200C are roller charging units adopting a contact-type charging system using charging rollers. According to this configuration, even if the user often forms black-and-white images, maintenance interval of the image forming portion 200K having a high frequency of use will not be shorter than the maintenance interval of the image forming portions 200Y to 200C having a low frequency of use, such that the maintenance intervals are made to be approximately the same. According to the large diameter drum configuration using adopting a corona charger, a wider charging width in the rotational axis direction of the photosensitive drum can be realized compared to the small-diameter drum configuration using a roller charging unit, and the configuration is suitable for speeding up the charging process, such that the productivity of forming black-and-white images can be improved.

According to the image forming and transferring apparatus 500 described above in which the configurations of the image forming portions 200Y to 200C and the image forming portion 200K somewhat differ, amount of toner charge may vary between the photosensitive drums 201Y to 201C and the photosensitive drum 201K due to the differences of shape and amount of wear. If there is a difference in toner charge, the transfer of toner image from the intermediate transfer belt 208 to the recording material S in the secondary transfer process will not be performed uniformly, and transfer failures may occur. Therefore, a pre-transfer charging unit 219 composed of a corona charger is arranged on the photosensitive drum 201K so as to achieve a toner charge similar to the photosensitive drums 201Y to 201C. The pre-transfer charging unit 219 performs charge control of, in further detail, imparts charge to, the photosensitive drum 201K before the toner image reaches the transfer nip portion formed of the photosensitive drum 201K and the primary transfer roller 207K, and uniformizes toner charge of the toner image formed on the photosensitive drum 201K.

According to the configuration described above, the image forming and transferring apparatus 500 having superior productivity, image quality, stability, and long life is provided, not only for forming full-color images but also for forming black-and-white images.

Fixing and Conveying Apparatus

Next, the fixing and conveying apparatus 600 will be described. As illustrated in FIG. 1, the fixing and conveying apparatus 600 includes the fixing unit 8 and the cooler 302. The fixing unit 8 includes a fixing roller 8*a* heated by a heater not shown, and a pressure roller 8*b* for pressing the recording material S against the fixing roller 8*a*. The recording material S conveyed from the image forming and transferring apparatus 500 to which a toner image has been formed is heated and pressed while being nipped and conveyed by a fixing nip portion N1 formed of the fixing roller 8*a* and the pressure roller 8*b*. Thereby, the toner image is fixed to the recording material S.

The fixing unit 8 composed of a roller pair of the fixing roller 8*a* and the pressure roller 8*b* has been described, but the present technique is not limited thereto. For example, a fixing unit having a fixing belt instead of the fixing roller 8*a* can be used, wherein the recording material S is heated and pressed while being nipped and conveyed by a fixing nip formed of the fixing belt heated by a heater and the pressure roller 8*b*, by which the toner image is fixed to the recording material S.

The recording material S heated by the fixing unit 8 is conveyed toward the cooler 302. The cooler 302 includes cooling belts 302*a* and 302*b*, and a heat sink 303. The cooling belts 302*a* and 302*b* abut against one another to form a cooling nip portion N2 for nipping and conveying the recording material S. The heat sink 303 is arranged in contact configuration on an inner circumference surface of a cooling belt 302*a*, and the heat sink 303 cools the cooling belt 302*a*. Thereby, the recording material S heated by the fixing unit 8 is cooled when being nipped and conveyed by the cooling nip portion N2.

The recording material S cooled by the cooler 302 is nipped and conveyed by a pair of cooling outlet rollers 601. In the case of a single-side printing mode in which the toner image is formed to only one side of the recording material S, the recording material S cooled by the cooler 302 is guided to a sheet discharge conveyance path 304, and is discharged from the casing 600A toward the sensing apparatus 107. Meanwhile, in the case of a duplex printing mode in which toner images are formed to both sides of the recording material S, the recording material S cooled by the cooler 302 is reversed in a reverse conveyance path 305 before being passed through a duplex conveyance path 306 and returned to the image forming and transferring apparatus 500. Then, a toner image is formed on the other side of the recording material S in the fixing unit 8 via a similar process as the single-side printing mode, and after being cooled by the cooler 302, the recording material S is guided to the sheet discharge conveyance path 304 and finally discharged from the casing 600A toward the sensing apparatus 107.

Airflow Unit

Figure 3:
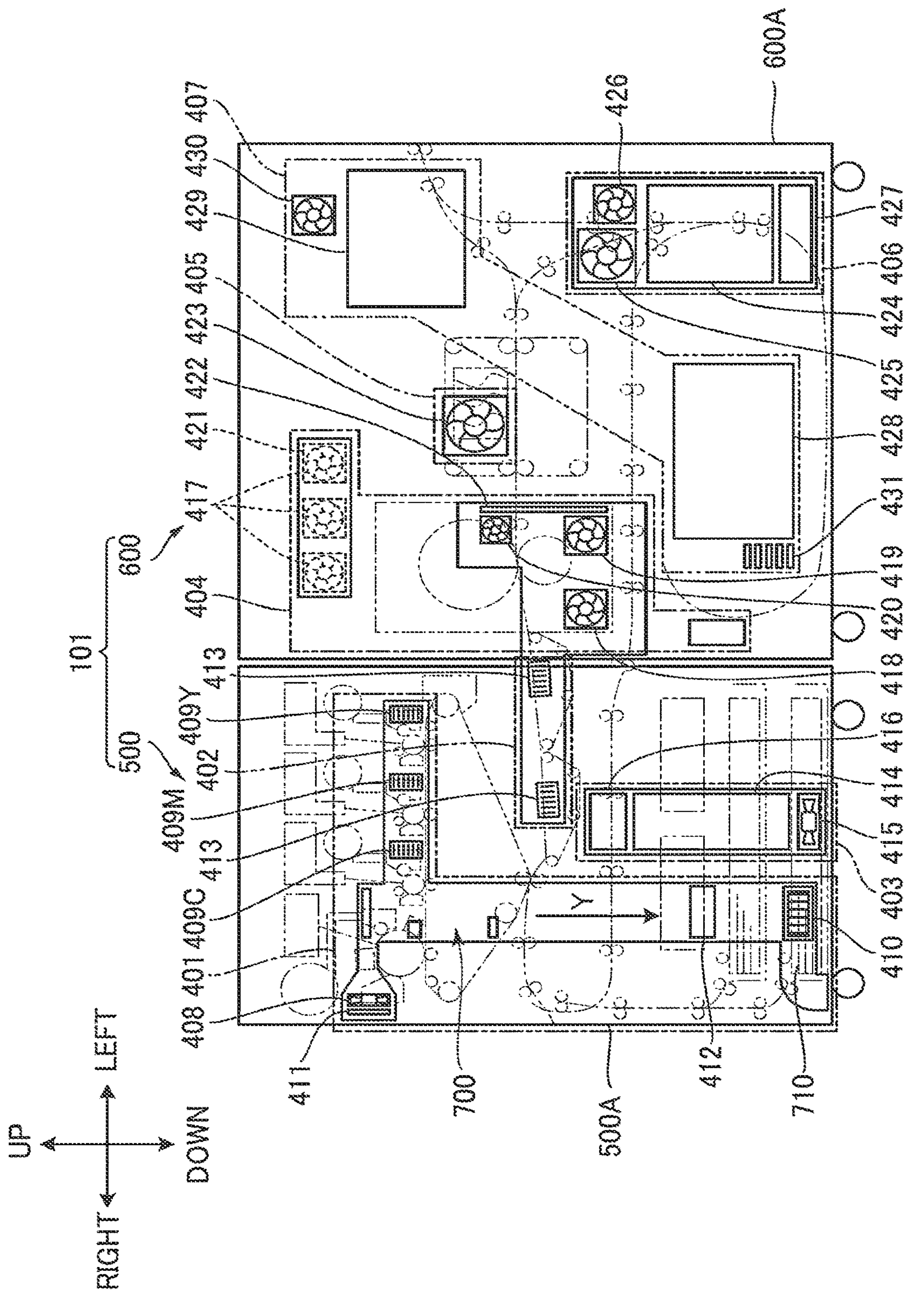
FIG. 3 is a rear view illustrating an airflow unit.
Figure 4:
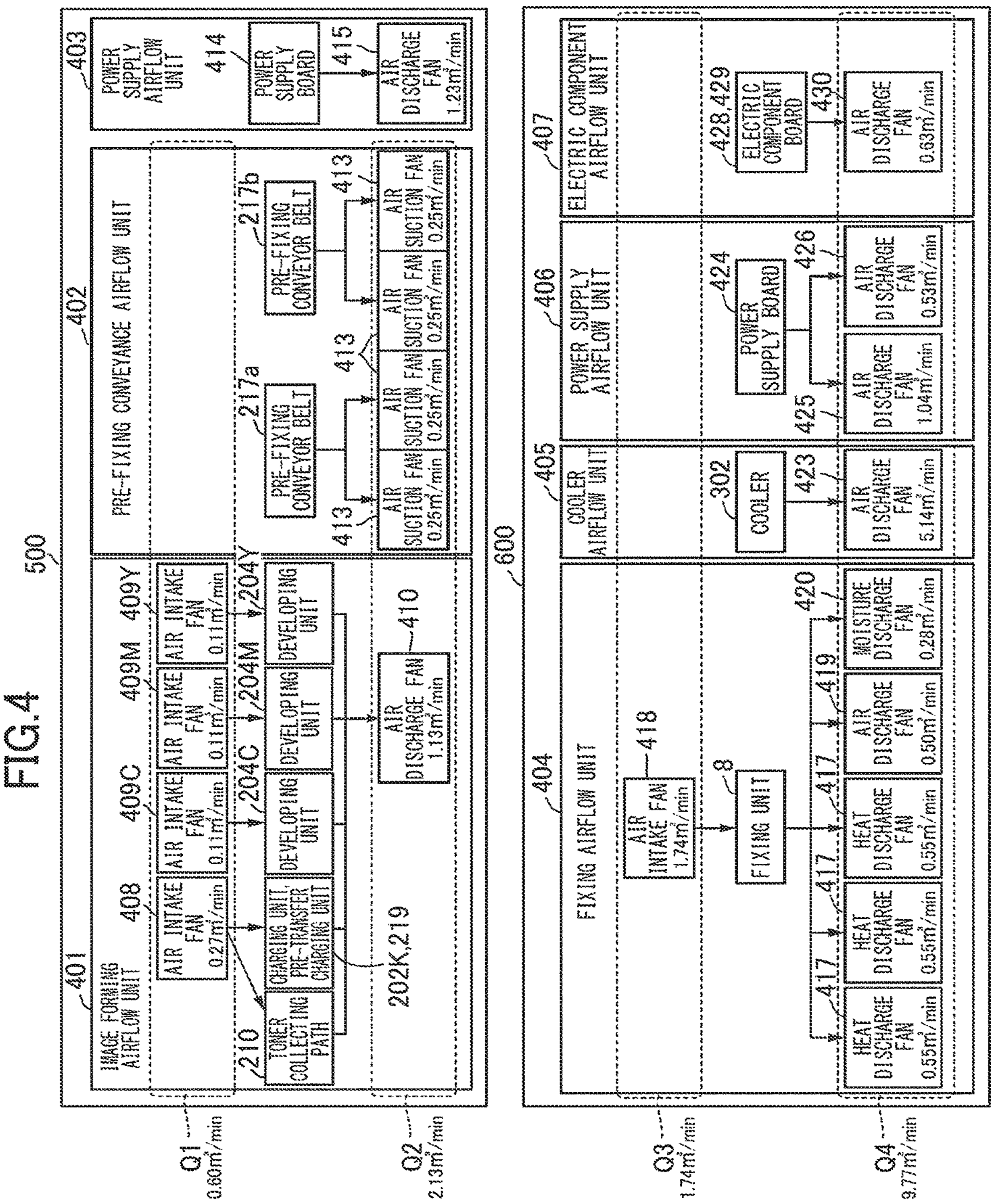
FIG. 4 is a block diagram illustrating one example of air flow rates of fans.

Next, an airflow unit arranged in the casings 500A and 600A for blowing air in the image forming apparatus 101 will be described based on FIGS. 3 and 4 with reference to FIGS. 1 and 2B. At first, the airflow unit of the image forming and transferring apparatus 500 will be described. As illustrated in FIG. 3, the airflow unit of the image forming and transferring apparatus 500 includes an image forming airflow unit 401, a pre-fixing conveyance airflow unit 402, and a power supply airflow unit 403.

The image forming airflow unit 401, which is an example of a blowing apparatus, or air discharge apparatus, includes an air intake fan 408, air intake fans 409Y, 409M, and 409C, an air discharge fan 410, and a duct unit 700, and discharges air from the inner side of the casing 500A to the outer side. The air intake fan 408 discharges the air surrounding the charging unit 202K toward the duct unit 700, and also takes in the air from the exterior of the casing 500A toward the charging unit 202K. A charging unit air intake filter 411 for collecting dust contained in the outer air for supplying clean air to the charging unit 202K is arranged on an air intake port of the air intake fan 408. The air flow rate of the air intake fan 408 is "0.27 $m^3$/min", for example.

The air intake fans 409Y, 409M, and 409C discharge air surrounding the developing units 204Y, 204M, and 204C toward the duct unit 700, and takes in the air from the exterior of the casing 500A toward the developing units 204Y, 204M, and 204C. Thereby, the developing units 204Y, 204M, and 204C are cooled. The air flow rate of the air intake fans 409Y to 409C is "0.11 $m^3$/min", for example.

The air discharge fan 410 discharges ozone, which is a discharged substance generated through corona discharge performed by the charging unit 202K and the pre-transfer charging unit 219, from the image forming portion 200K. Further, the air discharge fan 410 discharges the heat generated in the developing units 204Y, 204M, and 204C by friction during rotation from the image forming portion 200. Further, the air discharge fan 410 discharges the heat retained in the interior of the toner collecting path 210. In the present embodiment, a polyester resin is used as a binder resin of toner, such that if the temperature in the vicinity of the developing units 204Y to 204C reaches 40° C. or higher, image failures may occur, and if the temperature in the vicinity of the toner collecting path 210 reaches 45° C. or higher, clogging of toner may occur. Therefore, in the present embodiment, heat is discharged so as to lower the temperature in the vicinity of the developing units 204Y to 204C to 40° C. or lower, and to lower the temperature in the vicinity of the toner collecting path 210 to 45° C. or lower. Further, the air discharge fan 410 discharges the scattered toner that has scattered in the image forming process from the image forming portions 200Y to 200K. The air flow rate of the air discharge fan 410 is "1.13 $m^3$/min", for example. The air flow rate of the air discharge fan 410 is greater than the total air flow rate of the air intake fan 408 and the air intake fans 409Y, 409M, and 409C, which is "0.60 $m^3$/min".

An image forming air discharge filter 412 for collecting ozone and scattered toner discharged from the image forming portions 200Y to 200K is disposed upstream of the air discharge fan 410 in an air current direction, that is, arrow Y direction. By collecting ozone and scattered toner by the image forming air discharge filter 412, ozone and scattered toner can be prevented from being discharged outside the casing 500A.

In the case of the present embodiment, the air current generated by the air intake fan 408, the air intake fans 409Y to 409C, and the air discharge fan 410 described above passes through the tubular duct unit 700 disposed in the casing 500A to the outer side of the casing 500A. The image forming air discharge filter 412 is arranged in the duct unit 700. The duct unit 700 will be described in detail later (refer to FIGS. 6 and 7).

According to the image forming airflow unit 401 described above, ozone, scattered toner, and heat can be discharged efficiently to the exterior of the casing 500A without being retained inside the casing 500A. Therefore, charging failures such as uneven charging that is caused by ozone and scattered toner being attached to the photosensitive drum or the charging unit, developing failures that occur when toner is heated excessively and fluidity is deteriorated, operation failures such as clogging of the toner conveyance path, and transfer failures caused by ozone and scattered toner being attached to the pre-transfer charging unit 219 can be prevented.

An air suction fan 413 for sucking the recording material S onto an outer circumference surface of the pre-fixing conveyor belts 217*a* and 217*b* via air suction ports opening toward the pre-fixing conveyor belts 217*a* and 217*b* is disposed in an inner circumference portion of the pre-fixing conveyor belts 217*a* and 217*b*. A total of four air suction fans 413, two on each side of the pre-fixing conveyor belts 217*a* and 217*b* in the conveyance direction, can be arranged, for example. These air suction fans 413 constitute the pre-fixing conveyance airflow unit 402. The air suction fan 413 is controlled to optimum air flow rates by a control circuit not shown corresponding to the material and shape of the recording material S being conveyed. According to this configuration, the recording materials S formed of various materials can be conveyed stably without disturbing the toner image on the recording material S prior to fixture. The air flow rate of the air suction fans 413 is "0.25 $m^3$/min", for example.

The power supply airflow unit 403 includes an air discharge fan 415 for discharging heat generated in a power supply board 414 to the exterior of the casing 500A. Along with the discharge of air by the air discharge fan 415, outer air for cooling is supplied through a power supply air intake port 416, and the power supply board 414 can be cooled efficiently. According to this configuration, operation failures and malfunctions of the image forming and transferring apparatus 500 accompanying the lowering of output caused by excessive heating of the power supply board 414 can be prevented. The air flow rate of the air discharge fan 415 is "1.23 $m^3$/min", for example.

Next, the airflow unit of the fixing and conveying apparatus 600 will be described. As illustrated in FIG. 3, the airflow unit of the fixing and conveying apparatus 600 includes a fixing airflow unit 404, a cooler airflow unit 405, a power supply airflow unit 406, and an electric component airflow unit 407. The fixing airflow unit 404 includes a heat discharge fan 417, an air intake fan 418, an air discharge fan 419, and a moisture discharge fan 420.

The heat discharge fan 417 mainly discharges the heat that is generated in the fixing roller 8*a* of the fixing unit 8 to the exterior of the casing 600A. In the present embodiment, three heat discharge fans 417 are arranged in right and left directions. When a parting agent such as wax contained in the component constituting the fixing unit 8 or toner is heated, Volatile Organic Compounds (VOC) or Ultra Fine Particles (UFP) may be generated. Therefore, a fixing upper air discharge filter 421 for catching VOC and UFP is arranged on a downstream side of the air current that is generated by the heat discharge fan 417, which is the rear side in this example. The air flow rate of the heat discharge fan 417 is "0.55 $m^3$/min", for example.

The air intake fan 418 supplies outer air for cooling to the pressure roller 8*b* of the fixing unit 8. The air discharge fan 419 discharges the heat generated on the pressure roller 8*b* side of the fixing unit 8 to the exterior of the casing 600A. The moisture discharge fan 420 discharges the vapor that may occur by the recording material S containing water being heated by the fixing unit 8 to the exterior of the casing 600A. The air flow rate of the air intake fan 418 is "1.74 $m^3$/min", for example, and the air flow rate of the air discharge fan 419 is "0.50 $m^3$/min", for example. The air flow rate of the moisture discharge fan 420 is "0.28 $m^3$/min", for example.

A fixing lower air discharge filter 422 for catching VOC and UFP is arranged on a downstream side of the air current that is generated by the air discharge fan 419 and the moisture discharge fan 420, which is the left side in this example.

The air suction fan 413 described above may take in VOC and UFP from the casing 600A into the casing 500A. Therefore, according to the present embodiment, VOC and UFP contained in the air taken in by the air suction fan 413 can also be caught by the fixing lower air discharge filter 422.

According to the configuration of the fixing airflow unit 404 described above, the heat, moisture, VOC, and UFP that are generated during the fixing step can be discharged to the exterior of the casing 600A efficiently without being retained in the casing 600A. That is, the configuration enables to prevent the occurrence of fixing failures and operation failures that may be caused by the heat being retained in the casing 600A and heating toner or components.

The configuration further prevents fixing failures that may occur by excessive heat being applied to toner during the fixing step due to overheating of the pressure roller 8*b* of the fixing unit 8 or separation failure of the recording material S from the fixing roller 8*a* and the pressure roller 8*b*. Further, dew condensation of a conveyance guide (not shown) caused by vapor being attached thereto, or conveyance failures and fixing failures caused by condensed dew drops being attached to the recording material S being conveyed can be prevented. Moreover, operations failures and conveyance failures that may be caused by the parting agent, i.e., wax, that has been vaporized by heat being solidified and attaching to components can be prevented.

The cooler airflow unit 405 includes an air discharge fan 423 for discharging the heat that has been discharged from the heat sink 303 of the cooler 302 to the exterior of the casing 600A. The heat sink 303 of the cooler 302 is a heat exchanger that absorbs heat from the recording material S after fixture via the cooling belt 302*a* and discharges the absorbed heat. According to this configuration, the recording material S being heated by the fixing unit 8 can be cooled efficiently, such that the amount of heat radiated from the recording material S in the conveyance path (304, 305, and 306, refer to FIG. 1) can be reduced. In other words, image failures and operation failures caused by toner being excessively heated by heat radiation from the recording material S can be prevented. Further, in a case where a large amount of products are stacked in a postprocessing apparatus, which is the sensing apparatus 107 according to the present example, it becomes possible to prevent the recording materials S from being attached to one another by toner.

The power supply airflow unit 406 is equipped with air discharge fans 425 and 426 for discharging the heat generated in a power supply board 424 to the exterior of the casing 600A. Along with the discharge of air by the air discharge fans 425 and 426, air for cooling is supplied through a power supply air intake port 427, and the power supply board 424 is thereby efficiently cooled. According to this configuration, operation failures and other failures that may occur by the power supply board 424 being heated excessively leading to reduced output may be prevented.

The electric component airflow unit 407 is equipped with an air discharge fan 430 for discharging the heat generated in the electric component boards 428 and 429 to the exterior of the casing 600A. Along with the discharge of air by the air discharge fan 430, the air for cooling is supplied through an electric component air intake port 431, and the electric component boards 428 and 429 are efficiently cooled. According to this configuration, operation failures and other failures that may occur by the electric component boards 428 and 429 being heated excessively leading to reduced output may be prevented.

Duct Unit

Figure 5A:
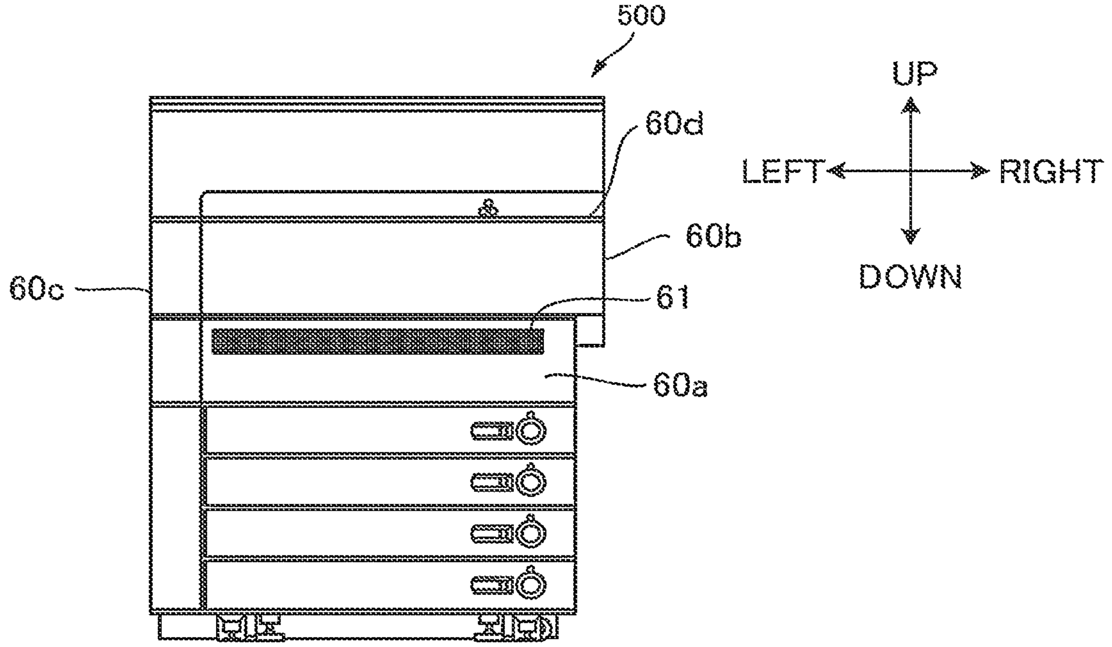
FIG. 5A is a front view illustrating an external appearance of the image forming and transferring apparatus.
Figure 5B:
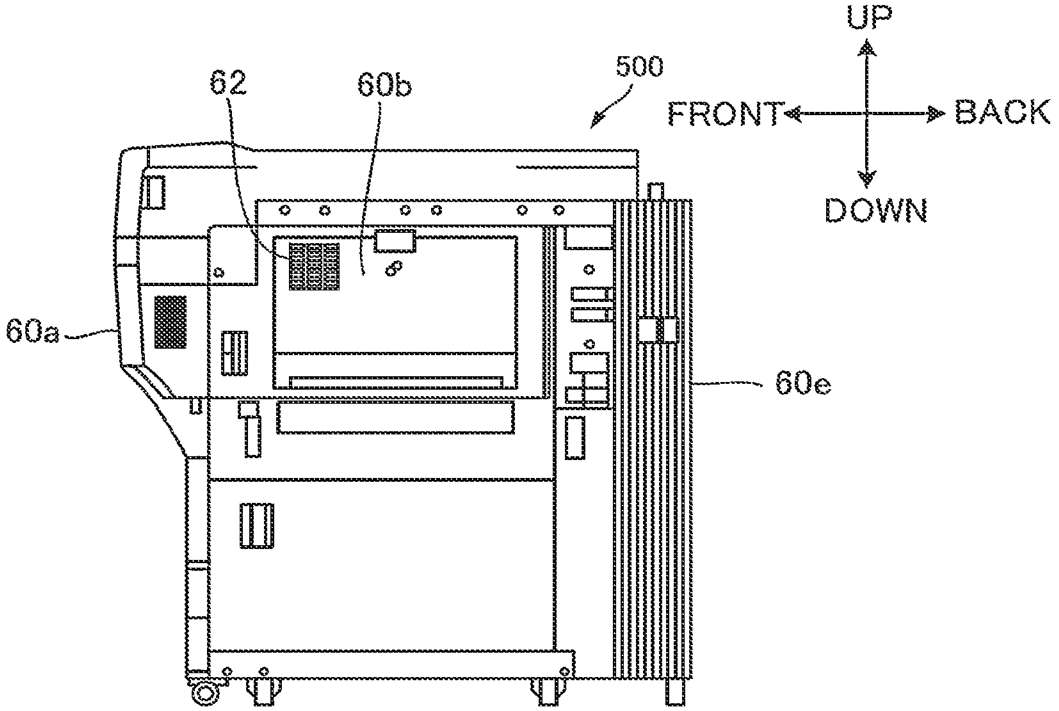
FIG. 5B is a right side view illustrating the external appearance of the image forming and transferring apparatus.

Next, the duct unit 700 will be described below based on FIGS. 5A to 7 with reference to FIGS. 2A to 3. As illustrated in FIGS. 5A and 5B, the casing 500A has exterior covers 60*a* to 60*e* made of resin attached thereto for covering the casing 500A and constituting an exterior thereof. In the present embodiment, a front cover 60*a* is arranged on a front side, a right side cover 60*b* is arranged on a right side, a left side cover 60*c* is arranged on a left side, a top cover 60*d* is arranged on an upper side, and a rear cover 60*e* is arranged on a rear side as the exterior covers. Further, an air intake port 61 is formed on the front cover 60*a* and an air intake port 62 is formed on the right side cover 60*b* to take air into the casing 500A.

The air intake fans 409Y to 409C described above take air into the casing 500A from the exterior of the casing 500A through the air intake port 61. The air intake fan 408 takes air into the casing 500A from the exterior of the casing 500A through the air intake port 62, and blows the sucked air from the upper part of the charging unit 202K toward the photosensitive drum 201K.

In the present embodiment, the duct unit 700 is provided in the casing 500A to merge the air current generated by the air intake fan 408, the air current generated by the air intake fans 409Y to 409C, and the air current generated by the air discharge fan 410 as one air current and discharge the same.

However, when merging a plurality of air currents, in a case where merging points of the plurality of air currents are superposed and pressure loss is increased, the overall air discharge efficiency may be deteriorated. Therefore, in the present embodiment, the duct unit 700 is used to merge the plurality of air currents while suppressing the deterioration of air discharge efficiency.

Figure 6:
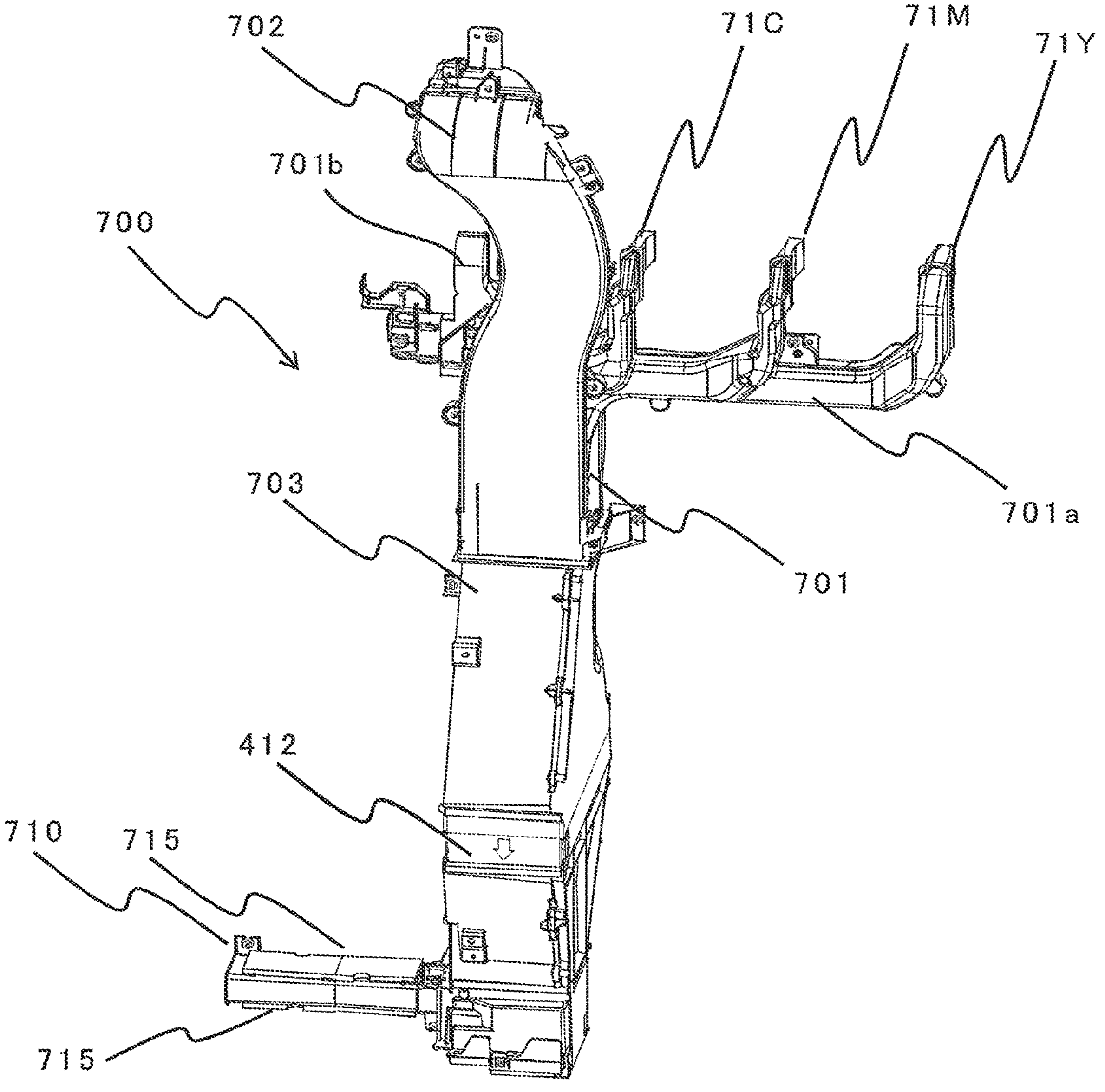
FIG. 6 is a perspective view illustrating a rear side of a duct unit.
Figure 7:
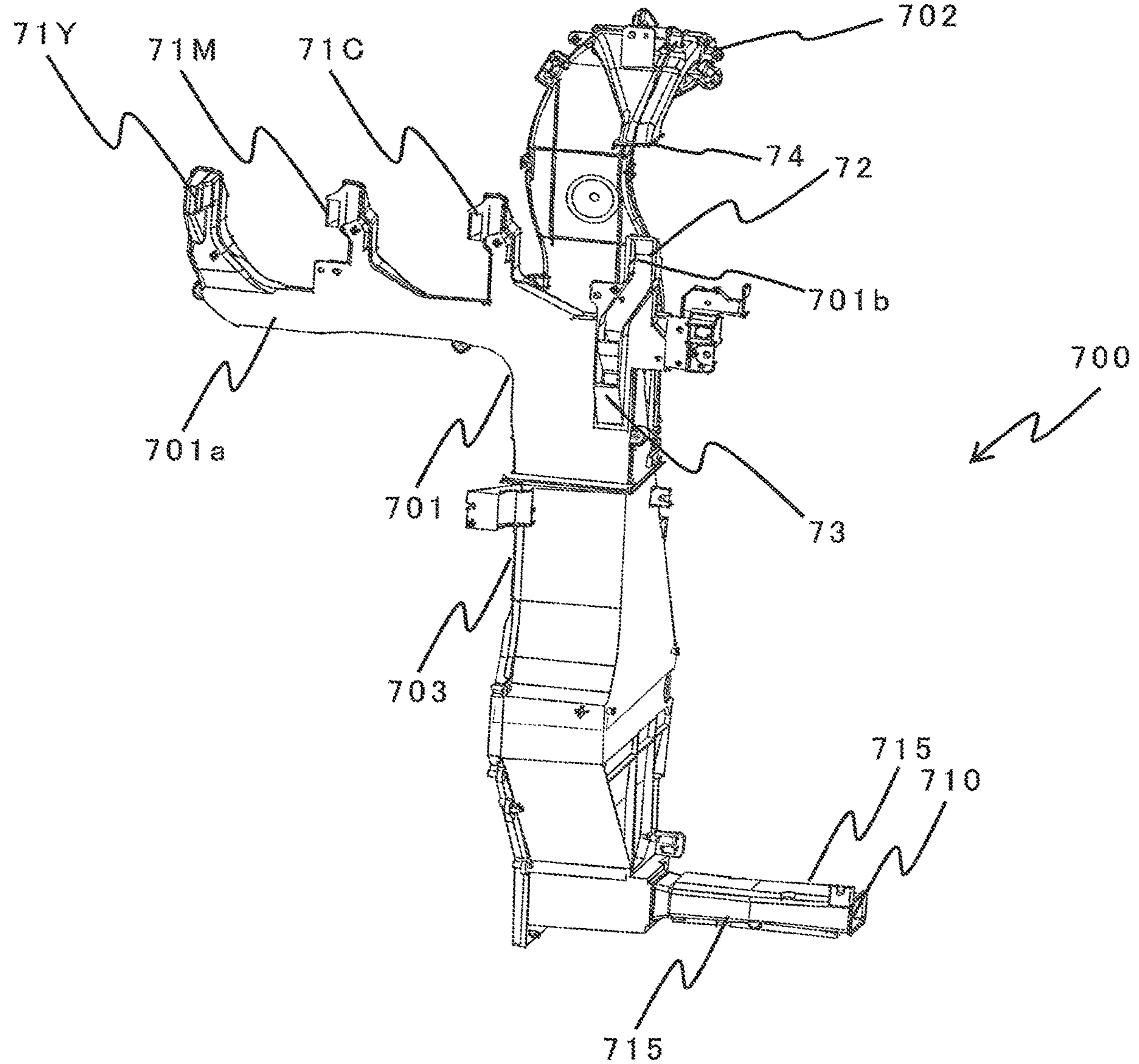
FIG. 7 is a perspective view illustrating a front side of the duct unit.

As illustrated in FIGS. 6 and 7, the duct unit 700 includes an air discharge duct 701, an ozone discharge duct 702, an air discharge duct 703, and a noise reduction duct 710. In the present embodiment, the duct arranged downstream in the direction of the air current of the air discharge fan 410 adopts the noise reduction duct 710 that differs from the conventional duct. The noise reduction duct 710 will be described in detail below with reference to FIGS. 8 to 11.

The air discharge duct 701 is formed of an image developing air discharge portion 701*a* and a cooling and air discharge portion 701*b* being formed integrally by resin. Image developing air discharge ports 71Y, 71M, and 71C are formed to the image developing air discharge portion 701*a*. The image developing air discharge ports 71Y to 71C are formed at positions corresponding to the developing units 204Y to 204C so as to take in the air passing the vicinity of the developing units 204Y, 204*t*, and 204C into the image developing air discharge portion 701*a* along with the suction of air by the air intake fans 409Y, 409*t*, and 409C. That is, the air in the vicinity of the developing units 204Y to 204C is flown through the image developing air discharge ports 71Y to 71C into the image developing air discharge portion 701*a*, and the image developing air discharge portion 701*a* merges the air that has flown from the image developing air discharge ports 71Y to 71C. The vicinity of the developing units 204Y to 204C refers to the area around the developing units 204Y to 204C through which air taken in by the air intake fans 409Y to 409C flows.

A pre-transfer charge air discharge port 72 and an image forming cooling port 73 are formed to the cooling and air discharge portion 701*b*. The pre-transfer charge air discharge port 72 is formed to take in the air containing ozone that has been generated in the pre-transfer charging unit 219 from the vicinity of the pre-transfer charging unit 219 to the cooling and air discharge portion 701*b*. The image forming cooling port 73 is formed to take in the air in the vicinity of the toner collecting path 210 to the cooling and air discharge portion 701*b*. In the present embodiment, air is flown through the pre-transfer charge air discharge port 72 and the image forming cooling port 73 into the cooling and air discharge portion 701*b* along with the operation of the air discharge fan 410. The vicinity of the pre-transfer charging unit 219 refers to an area around the pre-transfer charging unit 219 from which air is discharged along with the operation of the air discharge fan 410. Further, the vicinity of the toner collecting path 210 refers to an area around the toner collecting path 210 from which air is discharged along with the operation of the air discharge fan 410. By having an air current formed in the cooling and air discharge portion 701*b*, ozone that is generated by the pre-transfer charging unit 219 can be caught by the image forming air discharge filter 412, and heat retained in the toner collecting path 210 can be discharged.

As described, the air discharge duct 701 merges the air taken in through the image developing air discharge ports 71Y to 71C, the pre-transfer charge air discharge port 72, and the image forming cooling port 73 using one air discharge fan 410 before having the air pass through the image forming air discharge filter 412. According to this configuration, the number of fans can be reduced, such that the space occupied by the casing 500A can be saved.

The ozone discharge duct 702 is a duct for taking in the air containing ozone generated in the charging unit 202K from the vicinity of the charging unit 202K. The air discharge duct 703 is a separate duct for merging the above-mentioned air current from the air discharge duct 701 and the air current from the ozone discharge duct 702 as one air current.

In the present embodiment, a sirocco fan having a high static pressure is used as the air discharge fan 410 to take in air efficiently from a narrow space, regardless of the small opening areas of the image developing air discharge ports 71Y to 71C, the pre-transfer charge air discharge port 72, and the image forming cooling port 73. The sirocco fan is a multiblade air blower having a large number of rectangular fins attached in a circle, and since it can output high static pressure regardless of its small size, an air current having a large air flow rate can be generated. The air discharge fan 410 is arranged in the duct unit 700. The air discharge duct 703 is connected to the air discharge fan 410 and air inside the duct is sucked by the air discharge fan 410.

However, the sirocco fan can generate especially loud fan noise, and the fan noise is an annoying noise for users. The causes of generation of fan noise include aerodynamic sound that is generated by the rotation of fins, air current noise that is generated by the disturbance of airflow, and machine noise that is generated mechanically, such as squeaking of a bearing portion. As already described, there have been attempts to reduce the air current noise to reduce the fan noise, and actually, a technique has been provided to reduce the air current noise using the principle of Helmholtz adopting a side branch-type noise reduction apparatus. The reduction of air current noise using the side branch-type noise reduction apparatus will be described with reference to FIG. 13.

Figure 13:
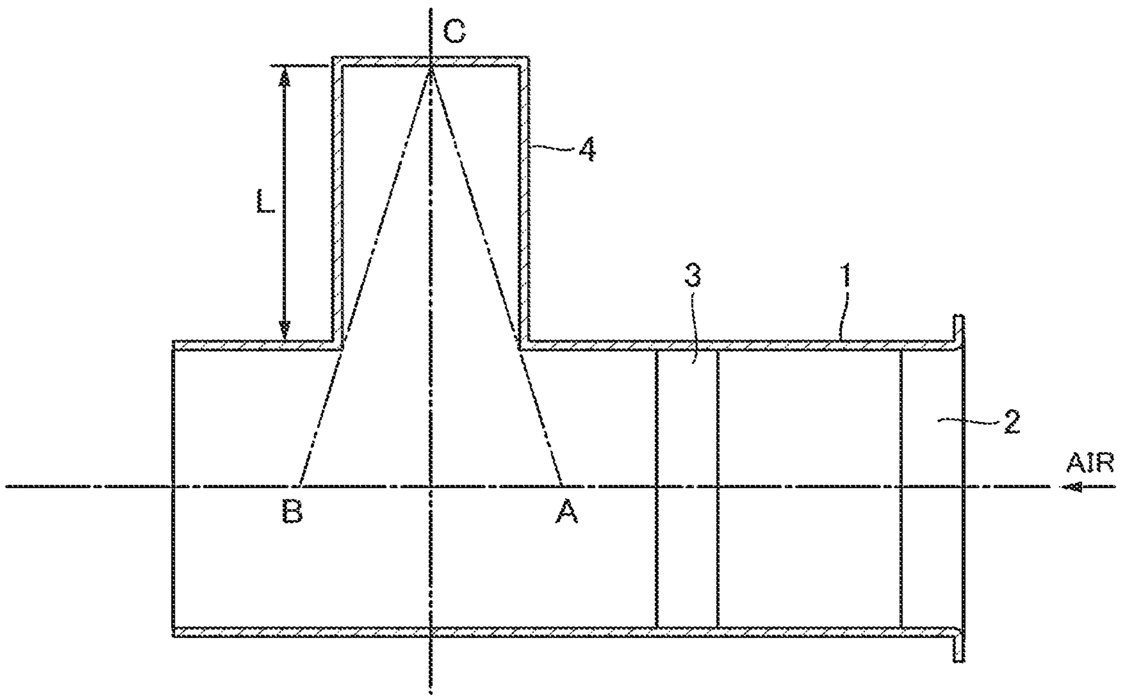
FIG. 13 is a schematic diagram illustrating a duct with a side branch according to a conventional technique.

As illustrated in FIG. 13, in the side branch-type noise reduction apparatus, a fan 2 is fixed to an end of a duct 1 attached to a casing (not shown). Further, a side branch 4 that is protruded toward a direction intersecting the air current direction from the side surface of the duct 1 is provided downstream in the air current direction, which is the direction in which the air generated in the duct 1 flows. In this case, the air current noise of the air current generated by the fan 2 is separated into a first path from point A to point B and a second path from point A via point C to point B. A length L of the side branch 4 is set such that phases of waveforms of the noise that passes the first path (point A to point B) and the noise that passes the second path (point A to point C to point B) are deviated by 180°. Therefore, the noise that passes the first path and the noise the passes the second path interfere with one another at point B, by which the air current noise is reduced.

However, further downsizing of the image forming apparatus 101 is desired, such that the space for installing fans and ducts is limited. Therefore, it is difficult to adopt a conventional side branch-type noise reduction apparatus. Specifically, speed of sound in air is "approximately 331000 mm/s", such that if the frequency of air current noise is assumed to be "1000 Hz", a distance λ that the air current noise advances in one cycle is "331000/1000=331 mm". In this case, in order to reduce the air current noise, the duct 1 with a side branch 4 having a length L of "2L=λ/2, L=λ/4=82.75 mm" must be installed. However, recent image forming apparatuses 101 do not have enough space to install the duct 1 having the side branch 4.

Therefore, in the present embodiment, the noise reduction duct 710 adopts a duct configuration in which a part of the duct constituting the air passage through which air current flows can be reduce of air current noise that is generated by the operation of the fan, without adopting the duct having the side branch. The noise reduction duct 710 will be described with reference to FIGS. 8 to 11. The following describes an example in which the noise reduction duct 710 is adopted as the duct arranged downstream in the air current direction of the air discharge fan 410 in the image forming airflow unit 401 for reducing air current noise that occurs by the operation of the air discharge fan 410.

Noise Reduction Duct

Figure 8:
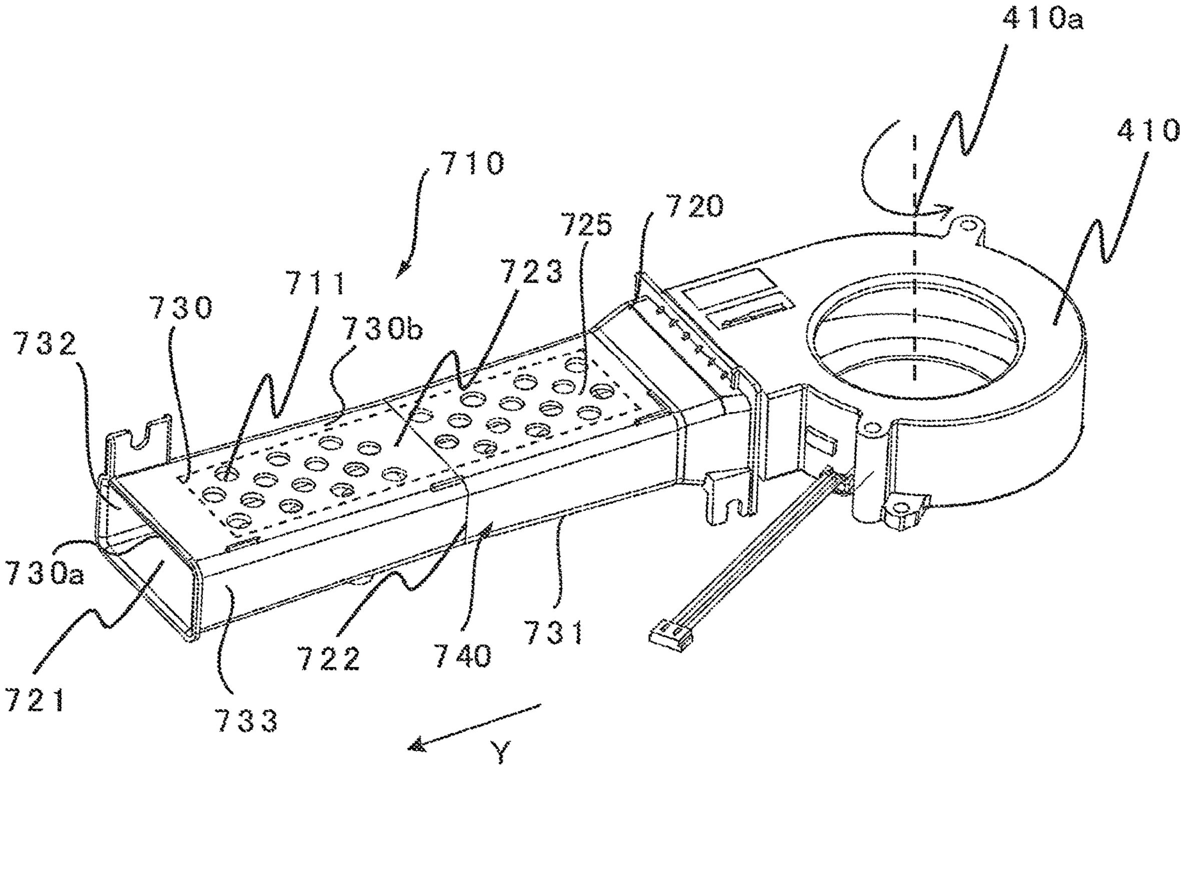
FIG. 8 is a perspective view illustrating a fan and a noise reduction duct.

An opening portion of the air discharge fan 410 is formed to have a rectangular cross-sectional shape. Along therewith, as illustrated in FIG. 8, the noise reduction duct 710 has a main body portion 740 formed to have a rectangular cross-sectional shape. The main body portion 740 includes a duct air intake port 720 through which air flows in along with the operation of the air discharge fan 410, and a duct air discharge port 721 through which air flows in from the duct air intake port 720. The main body portion 740 forms an air passage through which the air flown in from the duct air intake port 720 flows to the duct air discharge port 721. In other words, the main body portion 740 of the noise reduction duct 710 has a rectangular cross-sectional shape orthogonal to the air current direction, i.e., arrow Y direction, of air flowing through the air passage, formed of four sides. In the present embodiment, the cross-sectional shape of the noise reduction duct 710 is formed in a rectangular shape, but the present technique is not limited thereto. For example, the noise reduction duct 710 can be formed to have a tubular or polygonal cross-sectional shape.

In the present embodiment, the main body portion 740 includes wall portions 730 and 731 that face one another, and wall portions 732 and 733 that extend in a direction orthogonal to the wall portions 730 and 731 and that face one another. Thereby, the main body portion 740 has an approximately square cross-sectional shape. The main body portion 740 is designed to have a rectangular shape in which a width of the wall portions 730 and 731 which are two sides orthogonal to a rotational axis 410*a* of the air discharge fan 410 is wider than a width of the wall portions 732 and 733. A plurality of noise absorbing holes 711 as through holes for communicating the inner side of the main body portion 740 with the outer side are formed on the wall portions 730 and 731 having a wider width. That is, the noise reduction duct 710 includes a wall portion 730 serving as a first holed wall portion on which a plurality of noise absorbing holes 711 as first through holes are formed, and a wall portion 731 disposed to face the wall portion 730 interposing the air passage and serving as a second holed wall portion on which a plurality of noise absorbing holes 711 as second through holes are formed. The wall portion 730 and the wall portion 731 are two sides that constitute the long sides of an approximately rectangular cross-sectional shape of the main body portion 740. For example, the noise absorbing holes 711 formed on the wall portion 730 are formed to pass through an inner surface 730*a* of the wall portion 730 constituting the air passage and an outer surface 730*b* which is the opposite surface as the inner surface 730*a* of the wall portion 730.

Among the wall portions 730 to 733, the noise absorbing holes 711 can be formed only on the wall portions 732 and 733, or the noise absorbing holes 711 can be formed only on one of the four wall portions 730 to 733.

In the present embodiment, a part of the air current noise generated by the operation of the air discharge fan 410 enters the noise absorbing holes 711 and vibrates while passing through the noise reduction duct 710, by which a part of the acoustic energy is changed to thermal energy, realizing an effect of reducing the air current noise. Since the air discharge fan 410 is a sirocco fan in which air current is generated by fins rotating about the rotational axis 410*a* of the fan, such that a high noise reduction effect is achieved by forming the noise absorbing holes 711 to two wall portions 730 and 731 that are orthogonal to the rotational axis 410*a* of the fan. If the noise absorbing holes 711 are formed on only the other wall portions 732 and 733, the noise reduction effect is relatively small compared to the case where the noise absorbing holes 711 are formed on only the wall portions 730 and 731. However, if a sufficient noise reduction effect cannot be achieved by forming the noise absorbing holes 711 to only the wall portions 730 and 731, it is possible to form the noise absorbing holes 711 to all four wall portions 730 to 733 so as to enhance the noise reduction effect.

However, in a case where the noise reduction duct 710 is formed by injection molding a resin material using a mold, it is complex and expensive to prepare a mold capable of forming the noise absorbing holes 711 to all four walls. Therefore, it may be considered to prepare different molds to form parts having divided the noise reduction duct 710 and assembling the same. However, gaps tend to be formed between the divided parts, such that members for sealing the gaps must be provided in addition. Further, level difference may be formed at gaps between parts, which may increase the air current noise that is generated by the operation of the air discharge fan 410, so as a result, a sufficient noise reduction effect cannot be achieved even by forming the noise absorbing holes 711. Therefore, it is preferable to form the noise reduction duct 710 from one member by resin, and to form the noise absorbing holes 711, if possible, to only the wall portions 730 and 731 orthogonal to the rotational axis 410*a* of the fan.

In contrast, if the noise reduction duct 710 is made of metal, for example, by bending a sheet metal into a rectangular shape and punching holes to the sheet metal, noise absorbing holes 711 can easily be formed to all four sides of the noise reduction duct 710. Further, the distance between the noise absorbing holes 711 and 711 can be made smaller compared to the case where the duct is made of resin, such that there is a merit that the number of the noise absorbing holes 711 can be increased. However, as described below, metal requires higher cost than resin to form the noise reduction duct 710 having a downstream side of the duct air intake port 720 inclined so as to reduce the cross-sectional area of the air passage in the area where the noise absorbing holes 711 are formed. In consideration of the advantages and disadvantages described above, it is preferable to form the noise reduction duct 710 of resin rather than metal.

Figure 9:
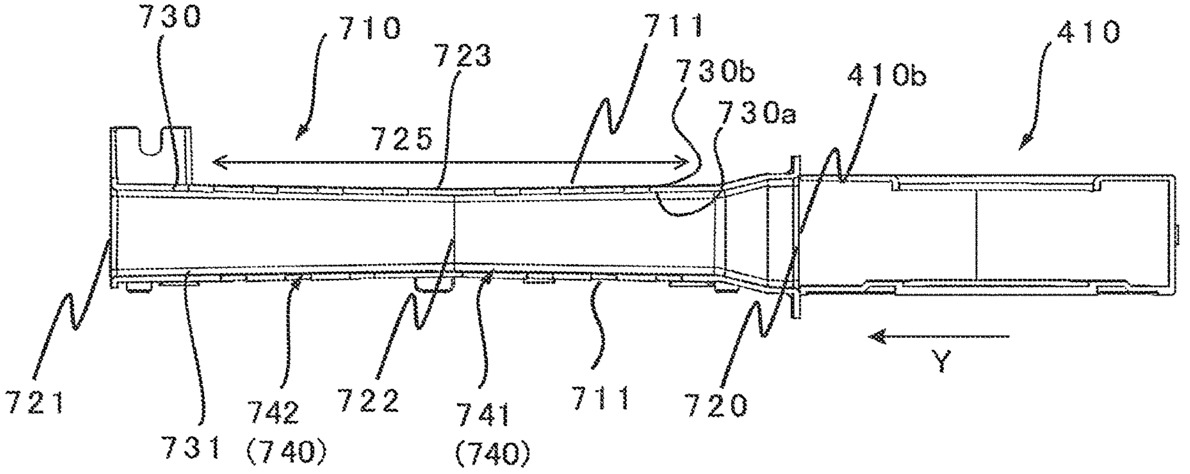
FIG. 9 is a cross-sectional view illustrating the fan and the noise reduction duct.

Further, if there is a level difference formed between an air outlet port 410*b* of the air discharge fan 410 illustrated in FIG. 9 and the duct air intake port 720 of the noise reduction duct 710, a large air current noise is generated. Therefore, it is preferable that such level difference does not exist, but it is difficult to form the air discharge fan 410 and the noise reduction duct 710 which are formed as different components to be connected without a level difference. Therefore, according to the present embodiment, the duct air intake port 720 is slightly widened than the air outlet port 410*b* of the air discharge fan 410.

The shape of the noise reduction duct 710 downstream in the air current direction of the duct air intake port 720 should preferably be designed to have the air current spread within the noise reduction duct 710 such that a part of the air current noise can easily enter the noise absorbing holes 711. In the present embodiment, the noise reduction duct 710 is designed to be inclined in the narrowing direction at the portion downstream of the duct air intake port 720, such that a cross-sectional area of the air passage in an area 725 having the noise absorbing holes in which the noise absorbing holes 711 are formed is made smaller than a cross-sectional area of the air outlet port 410*b*.

The main body portion 740 includes a first main body portion 741 in which a cross-sectional area of the air passage is narrowed from upstream toward downstream in the air current direction, i.e., arrow Y direction, in which air flows, and a second main body portion 742 which is formed in succession to a downstream side of the first main body portion 741 in which a cross-sectional area of the air passage is widened from upstream toward downstream in the air current direction. The first main body portion 741 and the second main body portion 742 are connected by the boundary portion 722. In other words, in the cross-sectional area orthogonal to the arrow Y direction serving as the air current direction, the cross-sectional area of the air passage formed by the boundary portion 722 becomes the smallest among cross-sectional areas of the air passage formed by the main body portion 740. The first main body portion 741 is designed such that the cross-sectional area of the duct is gradually narrowed from the duct air intake port 720 to the boundary portion 722, by having the wall portion 730 and the wall portion 731 incline by approximately one degree to gradually approximate each other. Further, the second main body portion 742 is designed such that the cross-sectional area of the duct is gradually widened from the boundary portion 722 to the duct air discharge port 721, by having the wall portion 730 and the wall portion 731 incline by approximately one degree to gradually separate from each other. As described, the noise reduction duct 710 is formed such that the air passage in the boundary portion 722 is narrower than the air passage in the duct air intake port 720. Further, the noise reduction duct 710 is formed such that the air passage in the duct air discharge port 721 is wider than the air passage in the boundary portion 722. Further, the wall portions 730 and 731 to which the plurality of noise absorbing holes 711 are formed are disposed across the first main body portion 741 and the second main body portion 742.

In the present embodiment, the first main body portion 741 is inclined to allow apart of the air current noise to easily enter the noise absorbing holes 711, as described above. Meanwhile, the second main body portion 742 is inclined to widen the cross-sectional area of the duct air discharge port 721. If the cross-sectional area of the duct air discharge port 721 is narrow, the air current noise flowing out of the main body portion 740 tends to increase, so the cross-sectional area is widened to prevent the same. In the present embodiment, as illustrated in FIG. 8, a bonding surface 723 is provided in the wall portion 730 and the wall portion 731 on the upstream side, in the air current direction, of the second main body portion 742, and the noise absorbing holes 711 are not formed on the bonding surface 723.

The noise absorbing holes 711 formed on the wall portion 730 and the noise absorbing holes 711 formed on the wall portion 731 are preferably formed at positions not overlapped with each other when the wall portion 731 is viewed from the wall portion 730. In other words, the plurality of noise absorbing holes 711 formed on the wall portion 731 are formed so as not to be overlapped with the plurality of noise absorbing holes 711 formed on the wall portion 730 when viewed from the outer surface 730*b* of the wall portion 730 toward the inner surface 730*a* (refer to FIGS. 8 and 9). By displacing the noise absorbing holes 711 on the wall portion 730 and those on the wall portion 731, a part of the air current noise easily enters the noise absorbing holes 711 on both the wall portions 730 and 731 in the noise reduction duct 710, such that the noise reduction effect of air current noise can be further enhanced. The noise absorbing holes 711 are preferably round holes with a hole diameter of “3 mm or more and 12 mm or less”. It is not necessary that the holes diameters of all the noise absorbing holes 711 are the same, but in the present embodiment, the hole diameters of the noise absorbing holes 711 are all set to “6.4 mm”. Further, it is preferable that the noise absorbing holes 711 are distributed uniformly in the main body portion 740.

Figure 10:
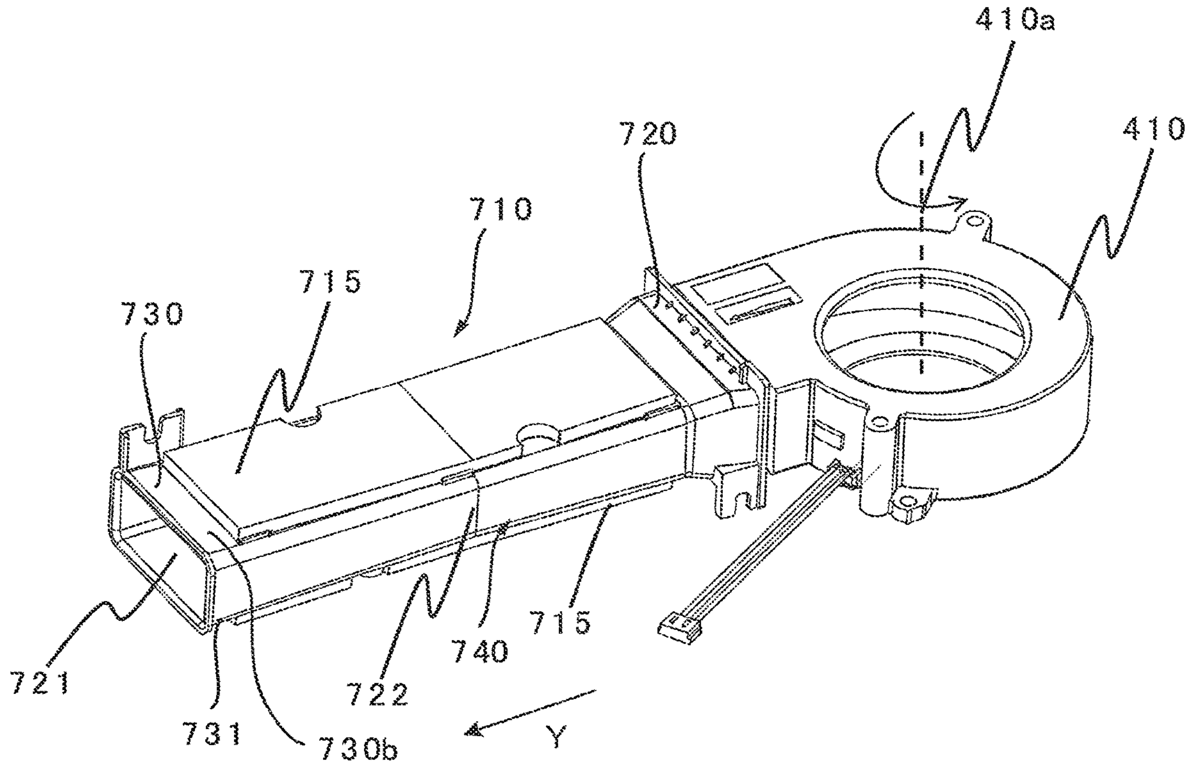
FIG. 10 is a perspective view illustrating the noise reduction duct having a noise absorption sheet attached thereto.

As illustrated in FIG. 10, in the wall portions 730 and 731, the plurality of noise absorbing holes 711 are all covered with noise absorption sheets 715 so as to prevent leakage of air current from the noise reduction duct 710. The noise absorption sheets 715 serving as noise absorbing members are each arranged on outer surfaces of the wall portions 730 and 731. For example, the noise absorption sheet 715 is bonded to the outer surface 730*b* of the wall portion 730. The noise absorption sheets 715 are formed in the shape of a sheet using a member having a noise absorbing property, such as ethylene propylene diene rubber (EPDM)-based or urethane-based foamed body, a glass wool material made of glass fiber, or a rock wool material made of minerals. The noise absorption sheets 715 may be formed by arbitrarily combining the above-mentioned materials, and it may not be formed in the shape of a sheet.

In general, the noise absorption sheets 715 should be thicker to easily achieve a noise reduction effect corresponding to noises having a wider frequency band, but in order to achieve a high effect with a low cost, the noise absorption sheets 715 formed of an EPDM-based foamed body with a thickness of “5 mm” are used in the present embodiment. If the EPDM-based or urethane-based noise absorption sheets 715 are used, the noise reduction effect cannot be easily achieved when crushed. Therefore, if a cover or the like is provided to the noise reduction duct 710, it is necessary that the cover does not crush the noise absorption sheets 715.

As described, by covering the noise absorbing holes 711 with the noise absorption sheets 715, a part of the air current noise entering the noise absorbing holes 711 enters the noise absorption sheets 715, and the noise is greatly diffused in the holes, during which a part of the acoustic energy is changed to thermal energy and the noise is reduced.

Figure 11:
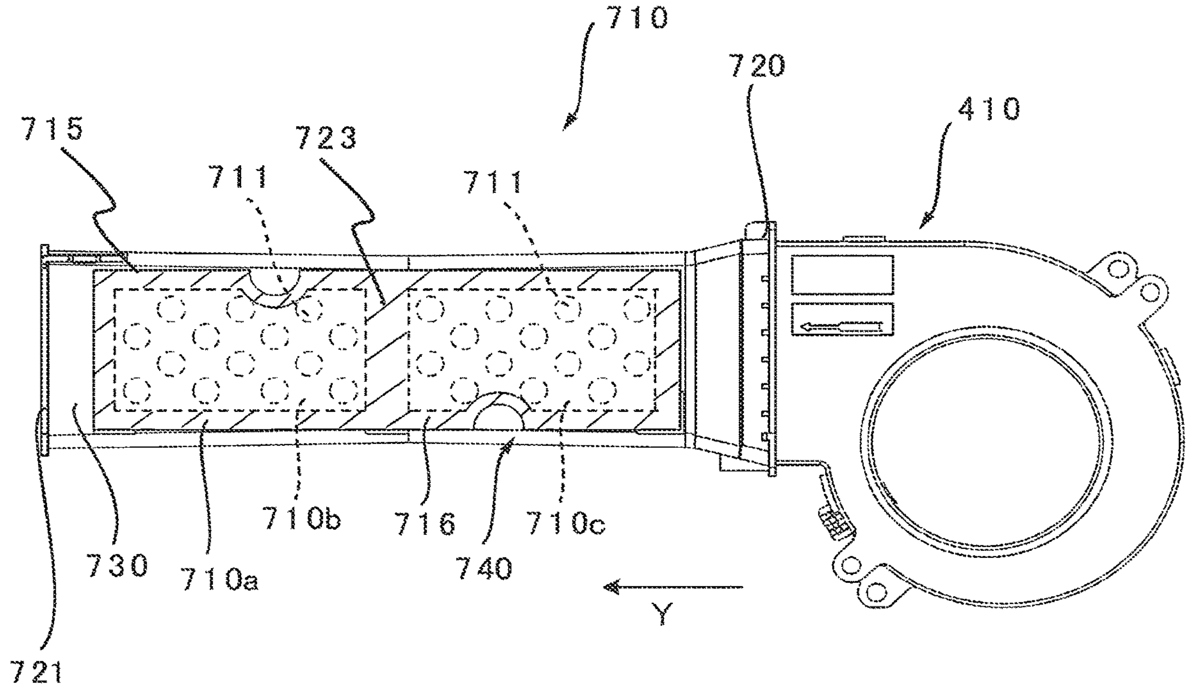
FIG. 11 is a top view illustrating an attaching area of the noise absorption sheet on the noise reduction duct.

As illustrated in FIG. 11, the noise absorption sheets 715 are attached to the noise reduction duct 710 with a double-sided tape 716 having adhesiveness as a bonded member. However, if the double-sided tape 716 covers even just a part of the noise absorbing holes 711, the noise reduction effect by the noise absorbing holes 711 is deteriorated compared to the case where the holes are not covered. Therefore, the double-sided tape 716 bonds the noise absorption sheets 715 to the noise reduction duct 710 in a non-formed area 710*a* where the noise absorbing holes 711 are not formed, i.e., area shown by diagonal lines, in other words, outside the range of areas 710*b* and 710*c* where the noise absorbing holes 711 are formed. The non-formed area 710*a* includes the bonding surface 723. Further, the noise absorption sheets 715 can be attached to the main body portion 740 via bonding agents or screws, instead of the double-sided tape 716.

However, if the noise absorption sheets 715 are bonded by the double-sided tape 716 only partially, for example to duct end portions 720 and 721, the noise absorption sheets 715 will be lifted up by the air current passing through the noise absorbing holes 711, such that the noise reduction effects by the noise absorption sheets 715 are deteriorated. Therefore, in addition to bonding the noise absorption sheets 715 to the duct end portions 720 and 721, the double-sided tape 716 bonds the noise absorption sheets 715 to the bonding surface 723 positioned at the center in the air current direction, i.e., arrow Y direction, of the noise reduction duct 710.

It is preferable to adopt a configuration in which the noise absorbing holes 711 formed on the wall portions 730 and 731 are provided for a predetermined ratio or more of a surface area of the area 725 having the noise absorbing holes of the main body portion 740. In the present embodiment, the area 725 having the noise absorbing holes refers to the area illustrated by dashed lines in FIG. 8 having connected an outer contour of the plurality of noise absorbing holes 711. For example, the ratio of the area occupied by the noise absorbing holes 711 to the area of the area 725 having the noise absorbing holes is preferably “5% or more”. However, in consideration of the workability of the noise absorbing holes 711 to the noise reduction duct 710 or the adhesive property of the double-sided tape 716, the ratio of the area occupied by the plurality of noise absorbing holes 711 to the surface area of the area 725 having the noise absorbing holes is more preferably “5% or more and 45% or less”.

In the present embodiment illustrated in FIG. 8, the ratio of the area occupied by the noise absorbing holes 711 provided on the wall portion 730 is “27.8%” to the area 725 having the noise absorbing holes. The present embodiment illustrates an example in which the noise absorbing holes 711 are provided on the wall portions 730 and 731, but even if the noise absorbing holes are provided on other wall portions 732 and 733, the holes should be provided to realize the above-mentioned ratio. Resin is assumed as the material of the noise reduction duct 710, and the distance between two noise absorbing holes 711 provided on the wall portions 730 and 731 is limited, for example, from the viewpoint of the strength the resin material, the strength of the mold in which the resin is molded, and formability. Though it depends on the wall thickness of the noise reduction duct 710, 3 mm or longer should be ensured as the distance between two noise absorbing holes 711, and a desirable ratio of area is calculated with the diameter of noise absorbing holes set to “3 mm or more and 12 mm or less”. However, even if the range falls out of the above-mentioned ratio of area, the noise reduction effect will merely be limited and not entirely lost.

Figure 12:
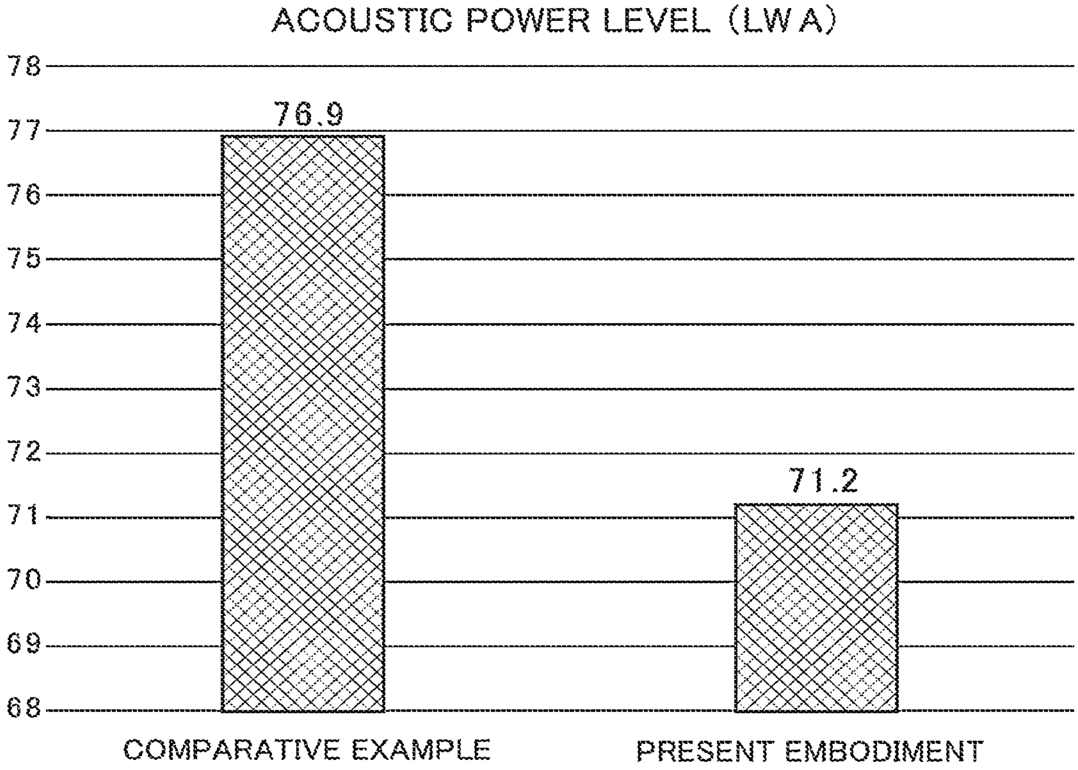
FIG. 12 is a graph illustrating a level of air current noise of a case where a noise reduction duct is used and a case where a duct having no noise absorbing holes is used.

FIG. 12 illustrates a result of comparison of intensity of air current noises based on acoustic power levels of cases where the air discharge fan 410 is operated alone, wherein one case uses the noise reduction duct 710 with the noise absorbing holes 711 according to the present embodiment and the other case uses the duct without the noise absorbing holes according to a comparative example. As can be recognized from FIG. 12, the acoustic power level according to the comparative example is “76.9 db”, and the acoustic power level according to the present embodiment is “71.2 db”. In other words, a noise reduction effect of “5.7 dB” is obtained by using the noise reduction duct 710 having the noise absorbing holes 711 according to the present embodiment. This means that the acoustic energy is reduced by “73%” to realize low noise.

In the case of a configuration in which noise is reduce by having a specific frequency interfere with the noise using a side branch as the noise reducing configuration, for example, a high noise reduction effect is realized for a specific frequency, but there may be a drawback in which a different frequency is resonated and increased. In contrast, no frequency is resonated by the noise reduction duct 710 according to the present embodiment, and a wide frequency area can be reduced, such that a higher noise reduction effect compared to the noise reduction configuration using the principle of Helmholtz can be realized. Further, since there is no need to vary the design in response to specific frequencies, a single design of noise reduction duct 710 can cope with a case where the fan has been changed to that with higher rotation speed or a case where one fan having variable rotational speed is used, without having to change the duct to a noise reduction duct 710 having a different shape. Moreover, the noise reduction duct 710 alone can cope with various uses, and there is no need to replace the duct with other noise reduction ducts 710 of different shapes such as different hole diameters.

As described, according to the present embodiment, a plurality of noise absorbing holes 711 are formed on the duct, and the plurality of noise absorbing holes 711 are covered with the noise absorption sheet 715 to form the noise reduction duct 710, by which the effect to reduce air current noise is achieved. That is, in a state where apart of the air current noise that is generated by the operation of the air discharge fan 410 passes through the noise absorbing holes 711, apart of the acoustic energy is changed to thermal energy, and the air current noise is reduced. Moreover, a part of the acoustic energy having passed through the noise absorbing holes 711 is further changed to thermal energy by the noise absorption sheet 715, and the air current noise is even further reduced. As described, the air current having been reduced by the noise reduction duct 710 is discharged through the duct air discharge port 721. Thereby, according to the present embodiment, air current noise generated by the operation of the fan can be reduced with a simple configuration without having to use a plurality of ducts having various lengths or a duct having a side branch as according to the conventional example. Furthermore, since there is no need to secure a large space for the side branch to have a specific frequency interfere with the noise, a significant noise reduction effect can be achieved in a small space, such that space is saved according to the present embodiment.

Other Embodiments

A sirocco fan has been used in the present embodiment described above, but the present technique is not limited thereto, and air current noise is similarly generated in other types of fans such as axial fans, such that the present embodiment is applicable regardless of the type of fan being used.

The noise reduction duct 710 described above is not only capable of being applied to a duct arranged downstream in the air current direction of the air discharge fan 410 in the image forming airflow unit 401, but it is also capable of being applied to a duct arranged upstream in the air current direction of the air discharge fan 410. Further, the noise reduction duct 710 is not only applicable to the image forming airflow unit 401, but also applicable to other air flow units described above (refer to FIG. 3).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-054094, filed Mar. 29, 2022, which is hereby incorporated by reference herein in its entirety.

What is claimed is:

1. An image forming apparatus comprising:

an image forming unit configured to form an image on a recording material;

a fan configured to generate an air current;

a duct including:

an air intake port through which air flows in by an operation of the fan;

an air discharge port through which air flown in through the air intake port is discharged; and a body portion having a tubular shape and forming an air passage through which air taken in through the air intake port is flown to the air discharge port, the body portion including a holed wall portion to which a plurality of through holes are formed, the plurality of through holes being passed through between an inner surface, forming the air passage, of the holed wall portion and an outer surface, that is on an opposite side from the inner surface, of the holed wall portion; and a noise absorbing member attached to the outer surface of the holed wall portion so as to cover the plurality of through holes, the noise absorbing member having a noise absorbing property, wherein each of the plurality of through holes is a round hole having a hole diameter of 3 mm, 12 mm, or within a range between 3 mm and 12 mm.

2. The image forming apparatus according to claim 1, wherein a ratio of an area occupied by the plurality of through holes to a surface area of an area in which the plurality of through holes are formed on the holed wall portion is 5%, 45%, or within a range between 5% and 45%.

3. The image forming apparatus according to claim 1, wherein the noise absorbing member is bonded to a bonding surface, on which the plurality of the through holes are not formed, of the outer surface of the holed wall portion.

4. The image forming apparatus according to claim 1, wherein the body portion includes a first body portion in which a cross-sectional area of the air passage is narrowed from upstream toward downstream in an air current direction of air passing through the air passage, and a second body portion that is formed in succession to a downstream side of the first body portion and in which the cross-sectional area of the air passage is widened from upstream toward downstream in the air current direction, and wherein the holed wall portion is disposed across the first body portion and the second body portion.

5. The image forming apparatus according to claim 4, wherein the holed wall portion includes a bonding surface on which the plurality of through holes are not formed, the bonding surface being disposed on an upstream portion, in the air current direction, of the second body portion, and wherein the noise absorbing member is bonded to the bonding surface.

6. The image forming apparatus according to claim 1, wherein the holed wall portion is a first holed wall portion on which a plurality of first through holes are formed, and the body portion includes a second holed wall portion disposed to face the first holed wall portion interposing the air passage, a plurality of second through holes being formed on the second holed wall portion.

7. The image forming apparatus according to claim 6, wherein the plurality of second through holes are formed so as not to overlap with the plurality of first through holes when viewed in a direction from the outer surface toward the inner surface.

8. The image forming apparatus according to claim 6, wherein the body portion is composed of four sides forming a rectangular cross-section orthogonal to an air current direction of air passing through the air passage, and the first holed wall portion and the second holed wall portion are two sides constituting long sides of the four sides.

9. The image forming apparatus according to claim 1, wherein the fan is connected to the air intake port of the body portion.

10. The image forming apparatus according to claim 1, wherein the fan is a sirocco fan.

11. The image forming apparatus according to claim 1, further comprising:

a separate duct connected to the fan and having air inside the separate duct sucked by the fan; and a filter configured to filter air passing through the separate duct.

12. The image forming apparatus according to claim 1, wherein the noise absorbing member is formed of ethylene propylene diene rubber.

13. The image forming apparatus according to claim 1, wherein the noise absorbing member is formed of a urethane-based foamed body.

14. The image forming apparatus according to claim 1, wherein the noise absorbing member is formed of glass wool or rock wool.

15. The image forming apparatus according to claim 1, wherein the noise absorbing member is formed in a sheet shape.

16. The image forming apparatus according to claim 1, further comprising a casing configured to store the image forming unit, the fan, and the duct, wherein the image forming unit includes a photosensitive member, a charging unit configured to charge the photosensitive member, an exposing unit configured to expose the photosensitive member being charged to form an electrostatic latent image on the photosensitive member, and a developing unit configured to develop the electrostatic latent image formed on the photosensitive member into a toner image using developer, and the duct is configured to guide air surrounding the charging unit toward an exterior of the casing.

17. The image forming apparatus according to claim 16, further comprising an air intake fan configured to discharge air surrounding the charging unit toward the duct and to take in air from the exterior of the casing toward the charging unit.

18. The image forming apparatus according to claim 1, further comprising a casing configured to store the image forming unit, the fan, and the duct, wherein the image forming unit includes a photosensitive member, a charging unit configured to charge the photosensitive member, an exposing unit configured to expose the photosensitive member being charged to form an electrostatic latent image on the photosensitive member, and a developing unit configured to develop the electrostatic latent image formed on the photosensitive member into a toner image using developer, and the duct is configured to guide air surrounding the developing unit to an exterior of the casing.

19. The image forming apparatus according to claim 18, further comprising an air intake fan configured to discharge air surrounding the developing unit toward the duct and to take in air from the exterior of the casing toward the developing unit.

20. An image forming apparatus comprising:

an image forming unit configured to form an image on a recording material;

a fan configured to generate an air current;

a duct including:

an air intake port through which air flows in by an operation of the fan;

an air discharge port through which air flown in through the air intake port is discharged; and a body portion having a tubular shape and forming an air passage through which air taken in through the air intake port is flown to the air discharge port, the body portion including a holed wall portion to which a plurality of through holes are formed, the plurality of through holes being passed through between an inner surface, forming the air passage, of the holed wall portion and an outer surface, that is on an opposite side from the inner surface, of the holed wall portion; and a noise absorbing member attached to the outer surface of the holed wall portion so as to cover the plurality of through holes, the noise absorbing member having a noise absorbing property, wherein a ratio of an area occupied by the plurality of through holes to a surface area of an area in which the plurality of through holes are formed on the holed wall portion is 5%, 45%, or within a range between 5% and 45%.

21. The image forming apparatus according to claim 20, wherein each of the plurality of through holes is a round hole having a hole diameter of 3 mm, 12 mm, or within a range between 3 mm and 12 mm.

22. The image forming apparatus according to claim 20, wherein the noise absorbing member is bonded to a bonding surface, on which the plurality of the through holes are not formed, of the outer surface of the holed wall portion.

23. The image forming apparatus according to claim 20, wherein the body portion includes a first body portion in which a cross-sectional area of the air passage is narrowed from upstream toward downstream in an air current direction of air passing through the air passage, and a second body portion that is formed in succession to a downstream side of the first body portion and in which the cross-sectional area of the air passage is widened from upstream toward downstream in the air current direction, and wherein the holed wall portion is disposed across the first body portion and the second body portion.

24. The image forming apparatus according to claim 23, wherein the holed wall portion includes a bonding surface on which the plurality of through holes are not formed, the bonding surface being disposed on an upstream portion, in the air current direction, of the second body portion, and wherein the noise absorbing member is bonded to the bonding surface.

25. The image forming apparatus according to claim 20, wherein the holed wall portion is a first holed wall portion on which a plurality of first through holes are formed, and the body portion includes a second holed wall portion disposed to face the first holed wall portion interposing the air passage, a plurality of second through holes being formed on the second holed wall portion.

26. The image forming apparatus according to claim 25, wherein the plurality of second through holes are formed so as not to overlap with the plurality of first through holes when viewed in a direction from the outer surface toward the inner surface.

27. The image forming apparatus according to claim 25, wherein the body portion is composed of four sides forming a rectangular cross-section orthogonal to an air current direction of air passing through the air passage, and the first holed wall portion and the second holed wall portion are two sides constituting long sides of the four sides.

28. The image forming apparatus according to claim 20, wherein the fan is connected to the air intake port of the body portion.

29. The image forming apparatus according to claim 20, wherein the fan is a sirocco fan.

30. The image forming apparatus according to claim 20, further comprising:

a separate duct connected to the fan and having air inside the separate duct sucked by the fan; and a filter configured to filter air passing through the separate duct.

31. The image forming apparatus according to claim 20, wherein the noise absorbing member is formed of ethylene propylene diene rubber.

32. The image forming apparatus according to claim 20, wherein the noise absorbing member is formed of a urethane-based foamed body.

33. The image forming apparatus according to claim 20, wherein the noise absorbing member is formed of glass wool or rock wool.

34. The image forming apparatus according to claim 20, wherein the noise absorbing member is formed in a sheet shape.

35. The image forming apparatus according to claim 20, further comprising a casing configured to store the image forming unit, the fan, and the duct, wherein the image forming unit includes a photosensitive member, a charging unit configured to charge the photosensitive member, an exposing unit configured to expose the photosensitive member being charged to form an electrostatic latent image on the photosensitive member, and a developing unit configured to develop the electrostatic latent image formed on the photosensitive member into a toner image using developer, and the duct is configured to guide air surrounding the charging unit toward an exterior of the casing.

36. The image forming apparatus according to claim 35, further comprising an air intake fan configured to discharge air surrounding the charging unit toward the duct and to take in air from the exterior of the casing toward the charging unit.

37. The image forming apparatus according to claim 20, further comprising a casing configured to store the image forming unit, the fan, and the duct, wherein the image forming unit includes a photosensitive member, a charging unit configured to charge the photosensitive member, an exposing unit configured to expose the photosensitive member being charged to form an electrostatic latent image on the photosensitive member, and a developing unit configured to develop the electrostatic latent image formed on the photosensitive member into a toner image using developer, and the duct is configured to guide air surrounding the developing unit to an exterior of the casing.

38. The image forming apparatus according to claim 37, further comprising an air intake fan configured to discharge air surrounding the developing unit toward the duct and to take in air from the exterior of the casing toward the developing unit.

39. An image forming apparatus comprising:

an image forming unit configured to form an image on a recording material;

a fan configured to generate an air current;

a duct including:

an air intake port through which air flows in by an operation of the fan;

an air discharge port through which air flown in through the air intake port is discharged; and a body portion having a tubular shape and forming an air passage through which air taken in through the air intake port is flown to the air discharge port, the body portion including a holed wall portion to which a plurality of through holes are formed, the plurality of through holes being passed through between an inner surface, forming the air passage, of the holed wall portion and an outer surface, that is on an opposite side from the inner surface, of the holed wall portion; and a noise absorbing member attached to the outer surface of the holed wall portion so as to cover the plurality of through holes, the noise absorbing member having a noise absorbing property, wherein the body portion includes a first body portion in which a cross-sectional area of the air passage is narrowed from upstream toward downstream in an air current direction of air passing through the air passage, and a second body portion that is formed in succession to a downstream side of the first body portion and in which the cross-sectional area of the air passage is widened from upstream toward downstream in the air current direction, and wherein the holed wall portion is disposed across the first body portion and the second body portion.

40. The image forming apparatus according to claim 39, wherein the holed wall portion includes a bonding surface on which the plurality of through holes are not formed, the bonding surface being disposed on an upstream portion, in the air current direction, of the second body portion, and wherein the noise absorbing member is bonded to the bonding surface.

41. An image forming apparatus comprising:

an image forming unit configured to form an image on a recording material;

a fan configured to generate an air current;

a duct including:

an air intake port through which air flows in by an operation of the fan;

an air discharge port through which air flown in through the air intake port is discharged; and a body portion having a tubular shape and forming an air passage through which air taken in through the air intake port is flown to the air discharge port, the body portion including a holed wall portion to which a plurality of through holes are formed, the plurality of through holes being passed through between an inner surface, forming the air passage, of the holed wall portion and an outer surface, that is on an opposite side from the inner surface, of the holed wall portion; and a noise absorbing member attached to the outer surface of the holed wall portion so as to cover the plurality of through holes, the noise absorbing member having a noise absorbing property, wherein the holed wall portion is a first holed wall portion on which a plurality of first through holes are formed, wherein the body portion includes a second holed wall portion disposed to face the first holed wall portion interposing the air passage, a plurality of second through holes being formed on the second holed wall portion, and wherein the plurality of second through holes are formed so as not to overlap with the plurality of first through holes when viewed in a direction from the outer surface toward the inner surface.

* * * * *